United States Patent
Murugesan et al.

(10) Patent No.: US 11,201,556 B2
(45) Date of Patent: *Dec. 14, 2021

(54) ACCURATE PEAK DETECTION ARCHITECTURE FOR SECONDARY CONTROLLED AC-DC CONVERTER

(71) Applicant: Cypress Semiconductor Corporation, San Jose, CA (US)

(72) Inventors: Saravanan Murugesan, Bangalore (IN); Karri Rajesh, Visakhapatnam (IN); Pulkit Shah, Bangalore (IN); Arun Khamesra, Bangalore (IN); Hariom Rai, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/849,775

(22) Filed: Apr. 15, 2020

(65) Prior Publication Data

US 2020/0412265 A1 Dec. 31, 2020

Related U.S. Application Data

(63) Continuation of application No. 16/578,707, filed on Sep. 23, 2019, now Pat. No. 10,651,754, which is a (Continued)

(51) Int. Cl.
 *H02M 3/335* (2006.01)
(52) U.S. Cl.
 CPC .............................. *H02M 3/33592* (2013.01)

(58) Field of Classification Search
 CPC ............. H02M 3/335; H02M 3/33507; H02M 3/33569; H02M 3/33576; H02M 3/33592; H02M 7/217
 See application file for complete search history.

(56) References Cited

U.S. PATENT DOCUMENTS

| 5,485,361 A | 1/1996 | Sokal |
| 6,381,152 B1 | 4/2002 | Takahashi et al. |
| | (Continued) | |

FOREIGN PATENT DOCUMENTS

| CN | 104901546 A | 9/2015 |
| CN | 108471239 A | 8/2018 |
| | (Continued) | |

OTHER PUBLICATIONS

"UCC24630 Synchronous Rectifier Controller With Ultra-Low-Standby Current" Texas Instruments, Mar. 2015, pp. 1-41; 41 pages.
(Continued)

*Primary Examiner* — Gary L Laxton

(57) ABSTRACT

An AC-DC converter with synchronous rectifier (SR) architecture and method for operating the same are described. Generally, a secondary side integrated circuit (IC controller of the AC-DC converter includes a peak-detector block coupled to detect peak voltages sensed on a SR-SNS pin. The peak-detector block comprises a peak comparator, a sample-and-hold (S/H) circuit, and a DC offset circuit. The peak comparator is coupled to receive a sinusoidal input from the SR-SNS pin. The S/H circuit is coupled to sample the sinusoidal input and to provide a peak sampled voltage. The DC offset voltage circuit is coupled between the output of the S/H circuit and a reference voltage input of the peak comparator to subtract a DC offset voltage from the peak sampled voltage.

20 Claims, 16 Drawing Sheets

Related U.S. Application Data continuation-in-part of application No. 16/453,705, filed on Jun. 26, 2019, now Pat. No. 10,554,140.

(56) References Cited

U.S. PATENT DOCUMENTS

| | | |
|---|---|---|
| 6,456,511 B1 | 9/2002 | Wong |
| 6,504,267 B1 | 1/2003 | Giannopoulos |
| 6,671,189 B2 | 12/2003 | Jansen et al. |
| 8,581,505 B2 | 11/2013 | Melanson |
| 8,792,257 B2 | 7/2014 | Berghegger |
| 8,964,420 B2 | 2/2015 | Zhang |
| 9,093,903 B2 | 7/2015 | Swaminathan et al. |
| 9,325,246 B1 | 4/2016 | Peng et al. |
| 9,379,625 B2 | 6/2016 | Kesterson et al. |
| 9,502,985 B2 | 11/2016 | Werner et al. |
| 9,998,014 B2 | 6/2018 | Yao et al. |
| 10,554,140 B1 | 2/2020 | Khamesra et al. |
| 10,651,754 B1 * | 5/2020 | Murugesan ....... H02M 3/33592 |
| 2009/0268494 A1 | 10/2009 | Hu |
| 2010/0027298 A1 | 2/2010 | Cohen |
| 2012/0250366 A1 | 10/2012 | Wang et al. |
| 2014/0078788 A1 | 3/2014 | Yao et al. |
| 2014/0204624 A1 | 7/2014 | Djenguerian et al. |
| 2014/0254202 A1 | 9/2014 | Balakrishnan et al. |
| 2015/0103567 A1 | 4/2015 | Wang et al. |
| 2015/0280573 A1 | 10/2015 | Gong et al. |
| 2016/0111961 A1 | 4/2016 | Balakrishnan et al. |
| 2016/0359421 A1 | 12/2016 | Lin et al. |
| 2017/0033698 A1 | 2/2017 | Vemuri et al. |
| 2018/0159434 A1 | 6/2018 | Werner et al. |
| 2018/0351462 A1 | 12/2018 | Li et al. |
| 2018/0358902 A1 | 12/2018 | Duvnjak |
| 2019/0149056 A1 | 5/2019 | Zheng et al. |

FOREIGN PATENT DOCUMENTS

| | | |
|---|---|---|
| CN | 105680694 B | 7/2019 |
| JP | 6336784 B2 | 6/2018 |
| WO | 2009010802 A2 | 1/2009 |
| WO | 2018213015 A1 | 11/2018 |
| WO | 2019026706 A1 | 2/2019 |

OTHER PUBLICATIONS

USPTO Non-Final Rejection for U.S. Appl. No. 16/453,705 dated Aug. 21, 2019, 5 pages.
USPTO Non-Final Rejection for U.S. Appl. No. 16/455,568 dated Aug. 22, 2019, 9 pages.
USPTO Notice of Allowance for U.S. Appl. No. 16/453,705 dated Oct. 3, 2019, 10 pages.
USPTO Notice of Allowance for U.S. Appl. No. 16/455,568 dated Mar. 4, 2020; 9 pages.
USPTO Notice of Allowance for U.S. Appl. No. 16/455,568 dated Nov. 29, 2019; 9 pages.
USPTO Notice of Allowance for U.S. Appl. No. 16/578,707 dated Feb. 3, 2020; 9 pages.
USPTO Notice of Allowance for U.S. Appl. No. 16/579,339 dated Feb. 10, 2020; 9 pages.
USPTO Notice of Allowance for U.S. Appl. No. 16/740,189 dated Oct. 1, 2020, 9 pages.
USPTO Notice of Allowance for U.S. Appl. No. 16/849,735 dated May 6, 2021; 8 pages.
USPTO Notice of Allowance for U.S. Appl. No. 16/883,890 dated Jun. 24, 2021; 9 pages.
CNIPA Office Action for Application No. 202010576308.6 dated Jul. 14, 2021; 5 pages.

* cited by examiner

ACCURATE PEAK DETECTION ARCHITECTURE FOR SECONDARY CONTROLLED AC-DC CONVERTER

CROSS-REFERENCE TO RELATED APPLICATIONS

This application is a continuation of U.S. application Ser. No. 16/578,707, entitled Accurate Peak Detection Architecture for Secondary Controlled AC-DC converter, filed Sep. 23, 2019, which is a continuation-in-part of U.S. application Ser. No. 16/453,705, entitled AC-DC Converter with Secondary Side-Control and Synchronous Rectifier Sense Architecture, filed Jun. 26, 2019, now U.S. Pat. No. 10,554,140, issued Feb. 4, 2020, both of which are incorporated by reference herein.

TECHNICAL FIELD

This disclosure relates generally to AC-DC power converters, and more particularly to AC-DC converters including a flyback transformer, secondary side controller and synchronous rectifier sense architecture and methods of operating the same.

BACKGROUND

AC-DC converters convert power from an alternating current (AC) source to a direct current (DC) at a specified voltage level. AC-DC converters using secondary side control can deliver power more efficiently for a given size and weight, and are therefore widely used in portable electronic devices. Generally, an AC-DC converter transfers power from an AC input connected or coupled to a primary side of a transformer to a DC output coupled to a secondary side of the transformer.

A simplified schematic block diagram of one such AC-DC converter including a synchronous rectifier (SR) sense architecture is shown in FIG. 1. Referring to FIG. 1 the AC-DC converter 100, generally includes a rectifying circuit, such as a bridge rectifier 101, coupled to a transformer 102 rectify an AC input voltage, an active rectification element or power switch (PS), such as a PS field effect transistor (PS_FET 104) on a primary side of the transformer, a synchronous rectifier (SR), such as a SR field effect transistor (SR_FET 106) on a secondary side of the transformer, and an output filter or capacitor 108. In operation the PS_FET 104 switches power to the primary side on or off in response to a signal from a primary side controller 110. In secondary side controlled converters a secondary side controller 112 coupled to a drain node (SR_DRAIN 114) and gate of the SR_FET 106 senses voltage on the SR_DRAIN and turns the SR_FET on and off in response to sensed voltage peaks, and negative and zero-crossings.

In a AC-DC converter, the primary side controller 110 receives a signal from the SR_FET 106 or secondary side controller 112 over a feedback or flyback path 116. During the time in which the PS_FET 104 is on or closed with SR_FET 106 being off or open, the AC-DC converter 100 is said to be operating in fly-back mode, and a magnetic field builds up in the transformer 102 while a current on the primary side increases linearly. When the PS_FET 104 is off or opened, and SR_FET 106 is on or closed, the AC-DC converter 100 transfers the power to secondary side, in which the magnetic field begins to collapse and the secondary side current decreases steadily, but gradually as power is given to the Cout 108 connected to the output until a point is reached at which there is substantially zero current flow in the secondary.

One problem with previous generations of AC-DC converters using SR-SNS architecture is that depending on the turn-ratio (N:1) of the transformer 102 (typically 4:1), a voltage on the drain node 114 of the SR_FET 106 can go beyond the 1/Nth of rectified AC input voltage, often as high as 115V for 230V AC input. This in turn requires the use of a relatively large and expensive high-voltage FETs on SR_DRAIN node as well as additional electrostatic discharge (ESD) circuitry in the secondary side controller 112 to safely couple this voltage from the drain node 114 to the secondary side controller.

Prior approaches to at least partially addressing the above problem rely on use of a large, high power FET made with greater than 150V tolerant technology to sense SR_DRAIN node inside Secondary Controller 112 or use of external clamping circuits 118 to clip the input to the secondary side controller 112. These approaches have not been wholly satisfactory as the secondary side controller 112 is often realized as an integrated circuit (IC), and the use an external clamping circuit 118 to clip the input to the IC requires additional package pins and external components and connections for peak-detecting and feed-forward (feed-fwd) sensing because externally clipping the voltage on the SR_DRAIN 114 interferes with these detections. Thus, use of external clamping circuits 118 increases both the size and complexity of the IC and the number of package-pins of the IC dedicated to SR sensing. This in turn increases the bill of materials (BOM) needed for manufacturing the AC-DC converter 100 and the size of the IC on which the secondary side controller 112 is fabricated, both of which tend to increase cost while decreasing yield and utility of the AC-DC converter 100 in applications requiring compact power converters.

Another problem with previous generations of AC-DC converters 100, and secondary side controlled AC-DC converters in particular, arises due to requirement of detection of a valley or minimum voltage on the primary. In AC-DC converters 100 the PS_FET 104 should be turned on at the valley to minimize conduction loss and thereby achieve optimal efficiency. However, in secondary side controlled AC-DC converters 100, such as shown in FIG. 1, because the valley on the primary is detected as a peak on secondary side, which corresponds to a peak on secondary, detection of the peak needs to be done accurately. This additional requirement of peak detection results in additional components to be added on SR_DRAIN node, as the external clamping circuit 118 will not allow peaks on SR_DRAIN to be sensed accurately. Hence, additional component is required to be added on SR_DRAIN 114 for example Cpd is added in AC-DC converter 100, shown in FIG. 1 Thus, use of external peak-detect component (Cpd) increases both the size and complexity of the IC and the number of package-pins of the IC dedicated to SR sensing. This in turn increases the bill of materials (BOM) needed for manufacturing the AC-DC converter 100 and the size of the IC on which the secondary side controller 112 is fabricated, both of which tend to increase cost while decreasing yield and utility of the AC-DC converter 100 in applications requiring compact power converters. Consequently, with previous generations of AC-DC converters 100, it is not possible to hit the valley accurately resulting in loss of efficiency.

Accordingly, there is a need for an AC-DC converter with secondary side control and SR-SNS architecture and methods for operating the same that reduces cost and complexity without affecting performance. There is a further need for a AC-DC converter with secondary side control and SR-SNS architecture and methods for operating the same that provides accurate valley detection for improved efficiency.

SUMMARY

AC-DC converters with secondary side control and synchronous rectifier (SR) architecture and methods of operating the same are provided for reducing the cost, complexity and size of the converter while improving efficiency.

In one embodiment, the secondary side controller is implemented as an integrated circuit including a peak-detector (PKD) module to output a peak voltage detection signal (PKD_OUT), to enable a valley switching mode of operation. Generally, the PKS module includes a peak comparator with a first input coupled to a drain of the SR through a single SR sense (SR-SNS) pin to receive a sinusoidal input. A sample and hold (S/H) circuit with an input coupled to the SR-SNS pin samples the sinusoidal input and holds on an output of thereof a peak sampled voltage received on the input. A direct current (DC) voltage source coupled between the output of the S/H circuit second input of the peak comparator subtracts a DC offset voltage from the peak sampled voltage to compensate for DC offsets introduced by the S/H circuit and the peak comparator.

In another aspect or embodiment, methods of operating a secondary side controlled AC-DC converter including a PKD module with improved sensitivity and accuracy are provided to improve accuracy of valley detection in the primary, and efficiency of the converter. In one embodiment, the method comprising begins with coupling a sinusoidal signal from a drain of an SR on a secondary side of the AC-DC converter to PKD module in the secondary side controller. The sinusoidal signal is then clamped to maximum positive and negative voltages to generate an input signal (VSIG). The input signal is sampled and a peak voltage of the input signal held on an S/H capacitor. A DC offset voltage is subtracted from the peak voltage held on the S/H capacitor to generate a reference voltage (VREF). Next, the input signal is coupled to a signal input of a peak comparator while the reference voltage is coupled to a reference input of the peak comparator. The comparator compares the input signal to the reference voltage, and when the input signal goes below the reference voltage outputs a peak voltage detection signal (PKD_OUT) to enable a valley switching mode of operation.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS

Embodiments of the invention will now be described, by way of example only, with reference to the accompanying schematic drawings in which corresponding reference symbols indicate corresponding parts. Further, the accompanying drawings, which are incorporated herein and form part of the specification, illustrate embodiments of the present invention, and, together with the description, further serve to explain the principles of the invention and to enable a person skilled in the relevant art(s) to make and use the invention.

DETAILED DESCRIPTION

AC-DC converters with secondary side control and synchronous rectifier (SR) architecture including a single SR- SNS pin (SR_SNS) and methods of operating the same are disclosed for reducing the cost, complexity and size of the converter while improving efficiency. The system and methods of the present disclosure are particularly useful in or with AC-DC converters to improve valley detection for improved control of a primary side power switch or primary FET by a secondary side controller to improve efficiency of the converter.

Figure 1:
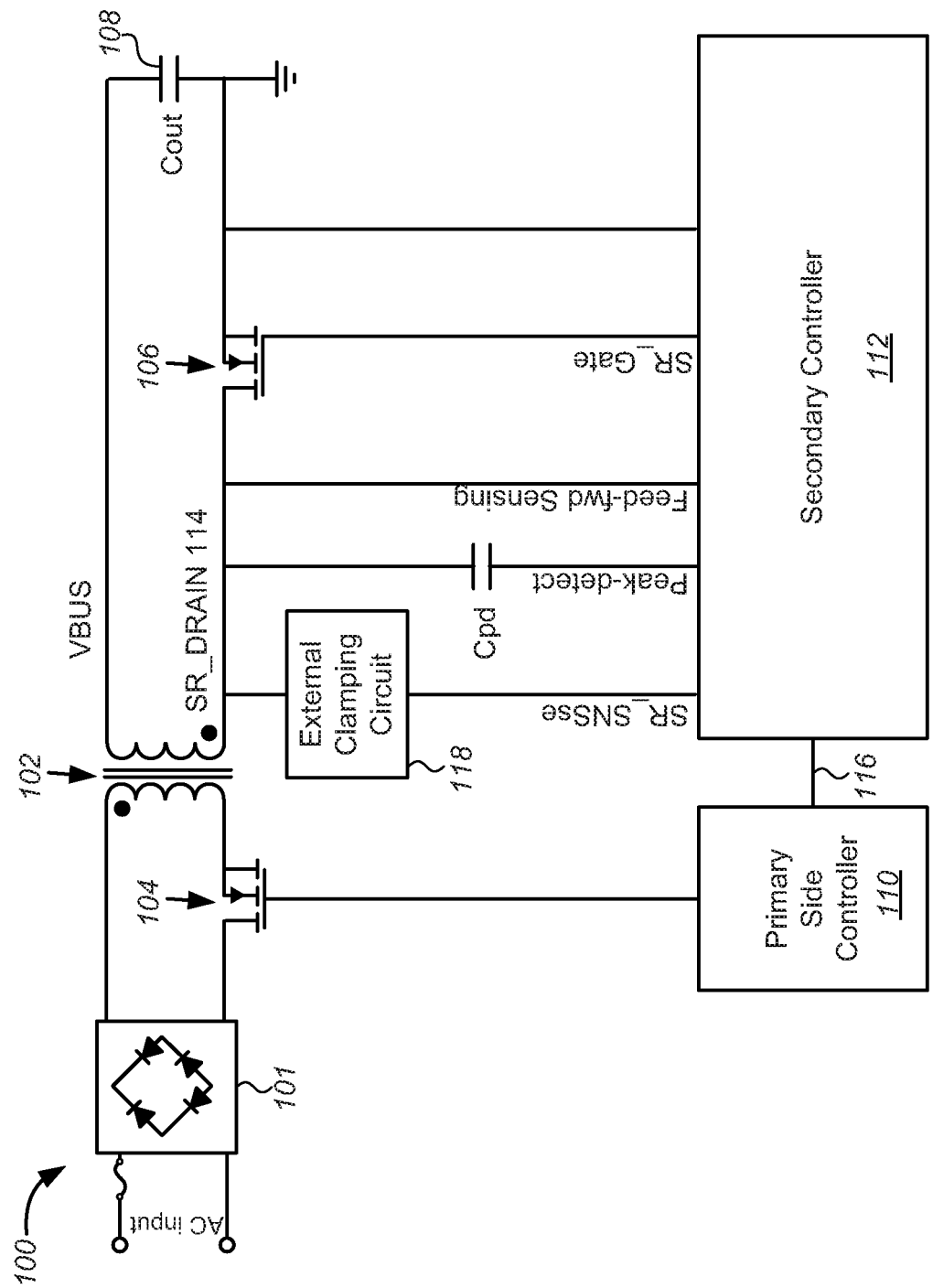
FIG. 1 is a schematic block diagram illustrating a AC-DC converter for which a secondary-side controller and synchronous rectifier (SR) architecture of the present disclosure is particularly useful.
Figure 2A:
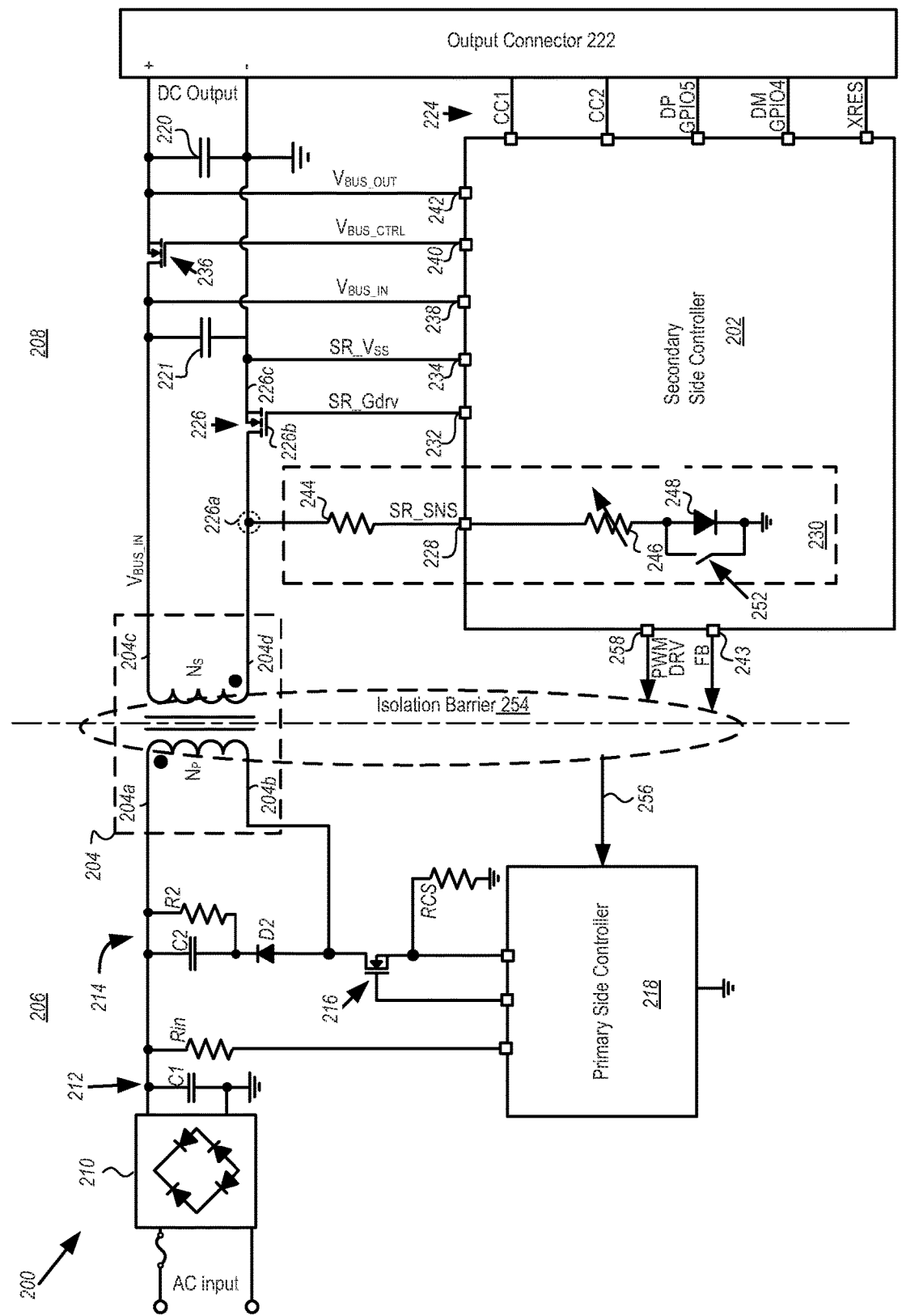
FIG. 2A is a schematic block diagram depicting an embodiment of an AC-DC converter including a secondary-side controller and SR architecture in accordance with the present disclosure.

An embodiment of an AC-DC converter including a secondary-side controller and SR architecture in accordance with the present disclosure will now be described with reference to FIGS. 2A through 2E. FIG. 2A is a schematic block diagram of an AC-DC converter 200 including an embodiment of a secondary-side controller 202 and having an SR architecture in accordance with the present disclosure. Referring to FIG. 2A, the AC-DC converter 200 generally includes a transformer 204 having a primary winding (NP) on a primary side 206 electrically connected or coupled to an AC input, and a secondary winding (NS) on a secondary side 208 coupled to a DC output.

On the primary side 206 a rectifying circuit, such as a bridge rectifier 210, and one or more input filters 212, 214, coupled to a first terminal 204a of the transformer 204 rectify an AC input voltage and supply input power to the primary winding of the transformer 204. The input filters can include a first input filter 212 having a capacitor (C1) coupled to or across an output of the rectifier 210, and a second, RC filter 214 including a resistor or resistive element (R2) and a capacitor (C2) coupled in parallel between the first terminal 204a of the transformer 204 and a cathode of a diode or rectifier (D2) having an anode coupled to a second terminal 204b of the transformer. Generally, as in the embodiment shown, the AC-DC converter 200 further includes a power switch (PS 216), such as a primary field effect transistor (PR_FET), having a first or drain node coupled to the second terminal 204b of the transformer 204, a second or gate node coupled to a primary side controller 218, and a third or source node coupled to the primary side controller and, through a current sensing element, such as a resistive element (RCS) to ground to sense a primary side current (I_primary) flowing through the primary winding when the PS 216 is closed or conducting. Generally, as in the embodiment shown, the primary side controller 218 is further coupled to the first terminal 204a of the transformer 204 through a resistive element (Rin) to receive a voltage or signal equal or proportional to the rectified AC input voltage.

On the secondary side 208 the AC-DC converter 200 includes a filter capacitor 221 coupled between a third terminal 204c of the transformer 204 and an electrical ground or ground terminal, and an output capacitor 220 coupled between a third terminal 204c of the transformer 204 and an electrical ground provide a DC output voltage to an output interface or connector 222. Generally, as in the embodiment shown the output connector 222 is further coupled to the secondary side controller 202 through a number of communication channels 224 to support various charging protocols. Suitable output connectors 222 can include those compatible with and supporting standard and proprietary charging protocols including Universal Serial Bus Power Delivery USB PD2.0 and USB PD3 with Programmable Power Supply (PPS), Qualcomm® Quick Charge, Samsung® AFC, and Apple® charging protocols. For example, the connector can include a Universal Serial Bus type C (USB-C) compatible connector where the AC-DC converter 200 is compliant with the USB protocol to provide a DC output voltage of about 3.3 VDC to about 21.5 VDC at a current of from about 0 to about 3000 milliamps (mA).

In accordance with the present disclosure, the AC-DC converter 200 further includes on the secondary side 208 a synchronous rectifier (SR 226), such as a synchronous rectifier field effect transistor (SR_FET), coupled between a fourth terminal 204d of the transformer 204 and the ground terminal of the DC output. The SR 226 includes a first or drain node 226a coupled to the fourth terminal 204d of the transformer 204 and the secondary side controller 202 to sense a voltage on the drain of the SR; a second or gate node 226b coupled to the secondary side controller to drive or control the SR; and a third or source node 226c coupled to the secondary side controller and the ground terminal of the DC output.

In certain embodiments, such as that shown, the secondary side controller 202 is realized or implemented as single integrated circuit (IC), or as a number of ICs packaged in a single IC package, and the drain node 226a is coupled to a single SR-SNS pin 228 of the IC through a voltage divider 230 including circuit elements both internal and external to the IC of the secondary side controller. The gate node 226b of the SR 226 is coupled to the secondary side controller 202 through a SR-drive pin 232, and the source node 226c of the SR is coupled to the secondary side controller through a SR-Vss (ground voltage level) pin 234.

Optionally, as in the embodiment shown, the secondary side further includes an additional or secondary switch (SS) 236, such as a NFET, coupled between the third terminal 204c of the transformer 204 and a positive DC output to enable to the secondary side controller 202 to turn off the DC output to protect against over voltage and/or under voltage conditions. The SS 236 includes a source node coupled to a voltage bus in pin ($V_{BUS\_IN}$) 238 of the secondary side controller 202; a gate node coupled to a voltage bus control pin ($V_{BUS\_CTRL}$) 240 to drive or control the SS; and a drain node coupled to a voltage bus out pin ($V_{BUS\_OUT}$) 242 and to the positive terminal of the DC output.

The voltage divider 230 includes an external resistive element 244, an internal resistive element 246 and an internal rectifier 248. Although shown schematically as a diode, it will be understood that this need not be case in every embodiment, and that internal rectifier 248 may be a PN diode (as shown), or alternatively, a synchronous diode or a FET configured or connected to function as a diode. The configuration or placement of the internal rectifier 248, i.e., connected with a cathode to ground, ensures that during negative sensing or zero-crossing operations there is substantially no current flow through the voltage divider 230, thereby allowing the full, undivided negative voltage on the drain node 226a to be coupled to the SR-SNS pin 228. A resistance value of external resistive element 244 is generally fixed by the manufacturer of the AC-DC converter 200 and is selected based on an expected maximum voltage on the drain node 226a based on the maximum AC voltage input, and turn-ratio of the transformer 204 to limit a maximum voltage on the SR_SEN node 228 to enable the secondary side controller 202 to be a made with non-high voltage devices, made using standard, low voltage technologies. Suitable values for the resistance of the resistive element 244 are from about 4 KΩ to about 10 KΩ. For example in one embodiment in which the maximum input voltage after bridge rectifier 210 is 380V and the transformer 204 has a 4:1 turn ratio, and the voltage of 21.5V DC on VBUS_IN, the SR_DRAIN 226a voltage can be 116.5V. Secondary side controller 202 is fabricated using a 20V tolerant technology, and the external resistive element 244 has a resistance of about 10 KΩ and internal resistance of about 2 KΩ to limit the maximum voltage on the drain node 226a to no more than about 21.5V.

The internal resistive element 246, shown schematically as a variable resistance in FIG. 2A, can have a resistance value set by the manufacturer at the time the AC-DC converter 200 is manufactured based on either desired input or output voltages, or to compensate for variations in parameters of the IC or other components in the AC-DC converter. Alternatively, the resistance value of the internal resistive element 246 can be dynamically adjusted by a calibration circuit in the AC-DC converter 200 or secondary side controller 202, either at start-up or powering on of the AC-DC converter, or periodically thereafter.

Optionally, as in the embodiment shown, the voltage divider 230 further includes a bypass switching element or switch 252 in parallel the internal rectifier 248. The switch 252 is closed during feed-forward (ff) sensing in response to an ff-signal (ff_enable) generated in the secondary side controller 202 upon detection of an increasing or non-zero positive voltage on the drain node 226a, which indicates a feed-forward operation. It is noted that although in the embodiment shown in FIG. 2A the internal rectifier 248 and the switch 252 are shown schematically as two separate and distinct elements, this need not be the case in every embodiment, and the rectifier and switch may alternatively include a single device, such as a FET, in which the switch is formed by the FET and the rectifier is formed by an intrinsic body diode between a source and drain of the FET.

As shown in FIG. 2A, the AC-DC converter 200 further includes an isolation circuit or barrier 254 to electrically isolate the secondary side 208 from the high AC input voltage present on the primary side 206. Because the transformer 204 is a step down transformer it is generally considered part of the isolation barrier 254. Additionally, where, as in the embodiment shown, the AC-DC converter 200 is a AC-DC converter in which a signal 256 is provided to the primary side controller 218 from pins on the secondary side controller 202, such as a feedback pin 243 or pulse width modulation (PWM) drive pin 258, the isolation barrier 254 can further include additional circuits or elements between the secondary side controller and the primary side controller 218 or PS 216. Details of these additional circuits or elements according to various embodiments are described below with reference to FIGS. 2C and 2D.

Figure 2B:
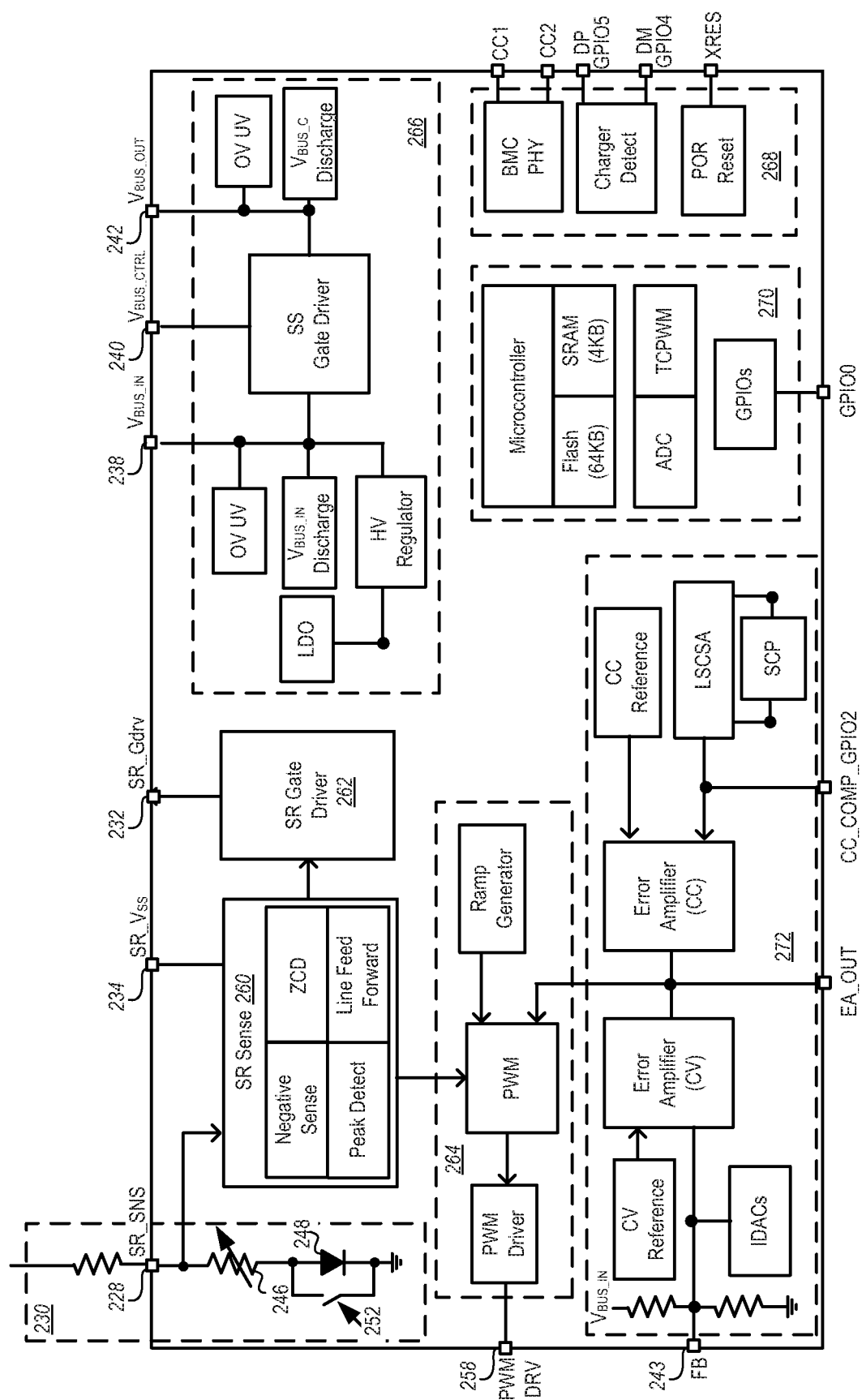
FIG. 2B is a detailed block diagram depicting an embodiment of the secondary-side controller of FIG. 2A in accordance with the present disclosure.

FIG. 2B is a detailed block diagram depicting an embodiment of the secondary-side controller 202 of FIG. 2A. Referring to FIG. 2B, in addition to the voltage divider 230 the secondary-side controller 202 generally further includes an SR sense module or block 260 and a SR gate driver module or block 262 coupled to the gate node 226b of the SR 226 through the SR-drive pin 232. The SR sense block 260 is coupled to the drain node 226a of the SR 226 through the single SR-SNS pin 228 and the voltage divider 230 and through the SR-Vss pin 234 to the source node 226c of the SR. The SR sense block 260 generally includes a zero-crossing detector (ZCD) block, a negative-sensing (NSN) block, a peak-detector (PKD) block, and a line-feed-forward (LFF) block for sensing a voltage on the drain 226a of the SR 226 to sense or detect a zero-crossing, a negative voltage, a peak (positive) voltage and a feed-forward operation. One or more outputs of the SR sense block 260 are coupled to the SR gate driver block 262 to control the SR 226 and to a pulse width modulation (PWM) circuit 264 to provide a signal 256 through the PWM drive pin 258 to the primary side controller 218 to control the PS 216. The PWM circuit 264 includes a ramp generator and PWM for generating a signal having a modulated pulse width, and a PWM driver for boosting a voltage or power of the signal to that necessary for driving the primary side controller 218 or PS 216.

As shown in FIG. 2B, the secondary side controller 202 further includes a secondary switch (SS) circuit 266. The SS circuit 266 includes OV-UV circuits or blocks for detection over voltage (OV) and under voltage (UV) conditions on $V_{BUS\_IN}$ 238 and $V_{BUS\_OUT}$ 242; low dropout (LDO) and high voltage (HV) regulators; and discharge circuits or blocks for discharging $V_{BUS\_IN}$ and $V_{BUS\_OUT}$.

An interface circuit 268 switch includes circuits or blocks for communicating with a device being powered or charged by the AC-DC converter 200 to support various charging protocols. These circuits or blocks can include a Biphase Mark Code (BMC) physical layer (PHY) to communicate with device using certain charging protocols, a charger detect block and a power on reset (POR) block to reset the device, putting it into a known state on initiation of charging by the AC-DC converter 200.

The secondary side controller 202 further includes a microcontroller unit (MCU) subsystem 270 including logic a microprocessor or controller for executing programs stored memory in the MCU subsystem; analog-to-digital converters (ADC); a multipurpose Timer Counter Pulse Width Modulator (TCPWM) capable of performing a multiple functions necessary for operation of the MCU; and a number of general purpose input/outputs (GPIOs), only one of which is shown.

Lastly, the secondary side controller 202 further includes a feedback circuit or circuit 272 coupled to the feedback pin 243 to provide error correction to the PWM circuit 264, and, in certain embodiments of the isolation barrier 254 to provide a feedback signal to the primary side controller 218. Generally, as in the embodiment shown circuit 272 includes a constant voltage (CV) reference, a constant current (CC) reference, one or more error amplifiers and inter-digital analog converters (IDACs), a low-side current sense amplifier (LSCSA), and a short circuit protection (SCP) block.

Embodiments of the isolation barrier 254 of the AC-DC converter 200 of FIG. 2A will now be described with reference to FIGS. 2C and 2D. It is noted that FIGS. 2C and 2D each illustrate one exemplary embodiments of the isolation barrier 254, and that other embodiments of the isolation barrier can be implemented that may or may not include all elements and components shown in these figures. Thus, the embodiments of FIGS. 2C and 2D are not intended to limit the present invention and the appended claims in any way.

Figure 2C:
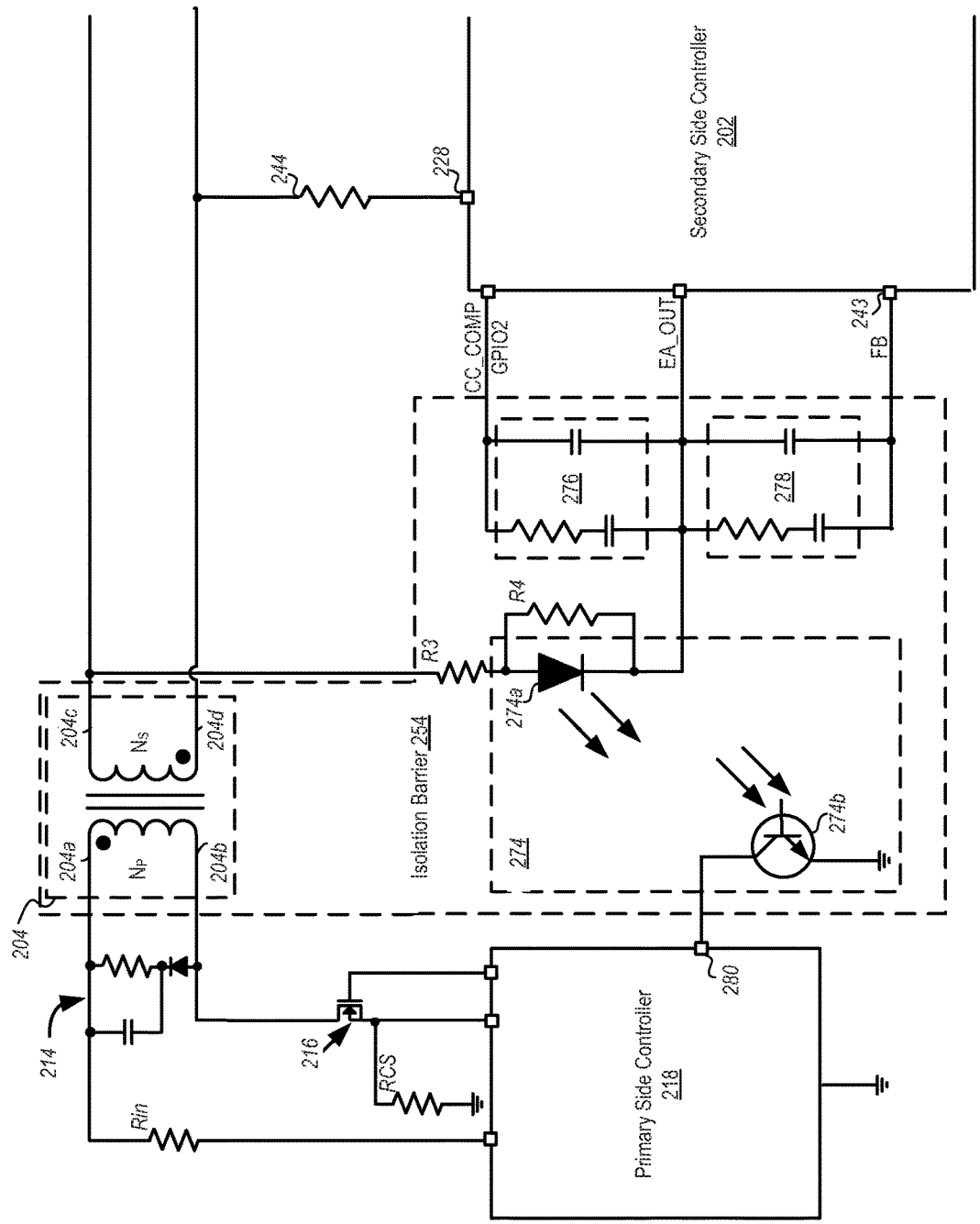
FIG. 2C is a schematic block diagram depicting an embodiment of the isolation barrier of FIG. 2A including an opto-isolator in accordance with the present disclosure.

Referring to FIG. 2C, in a first embodiment the isolation barrier 254 includes an opto-isolator 274 to provide electrical isolation between the feedback pin 243 of the secondary side controller 200 and the primary side controller 218. Generally, the opto-isolator includes a light emitting element, such as a light emitting diode (LED) 274a and a light sensitive element, such as a light sensitive or phototransistor 274b. The LED 274a has a cathode coupled directly to an error amplifier output pin (EA_OUT), and an anode coupled to the third terminal 204c of the transformer 204 through a voltage divider including a first resistive element (R3) and a second resistive element (R4). The cathode of the LED 274a is further coupled to the FB pin 243 and to a constant current compensation general purpose input/output (CC_COMP_G-PIO), through resistor-capacitor filters or networks 276 and 278. The phototransistor 274b can include a bipolar NPN transistor, and is coupled to the primary side controller 218 through an FB_input pin 280. In this embodiment, the secondary side controller 202 uses outputs from the error amplifier 272 to take the feedback from the secondary side and pass it on to the primary controller over the opto-isolator 274. This architecture provides three key features: secondary side sensing and regulation, synchronous rectification, and charging port controller.

Figure 2D:
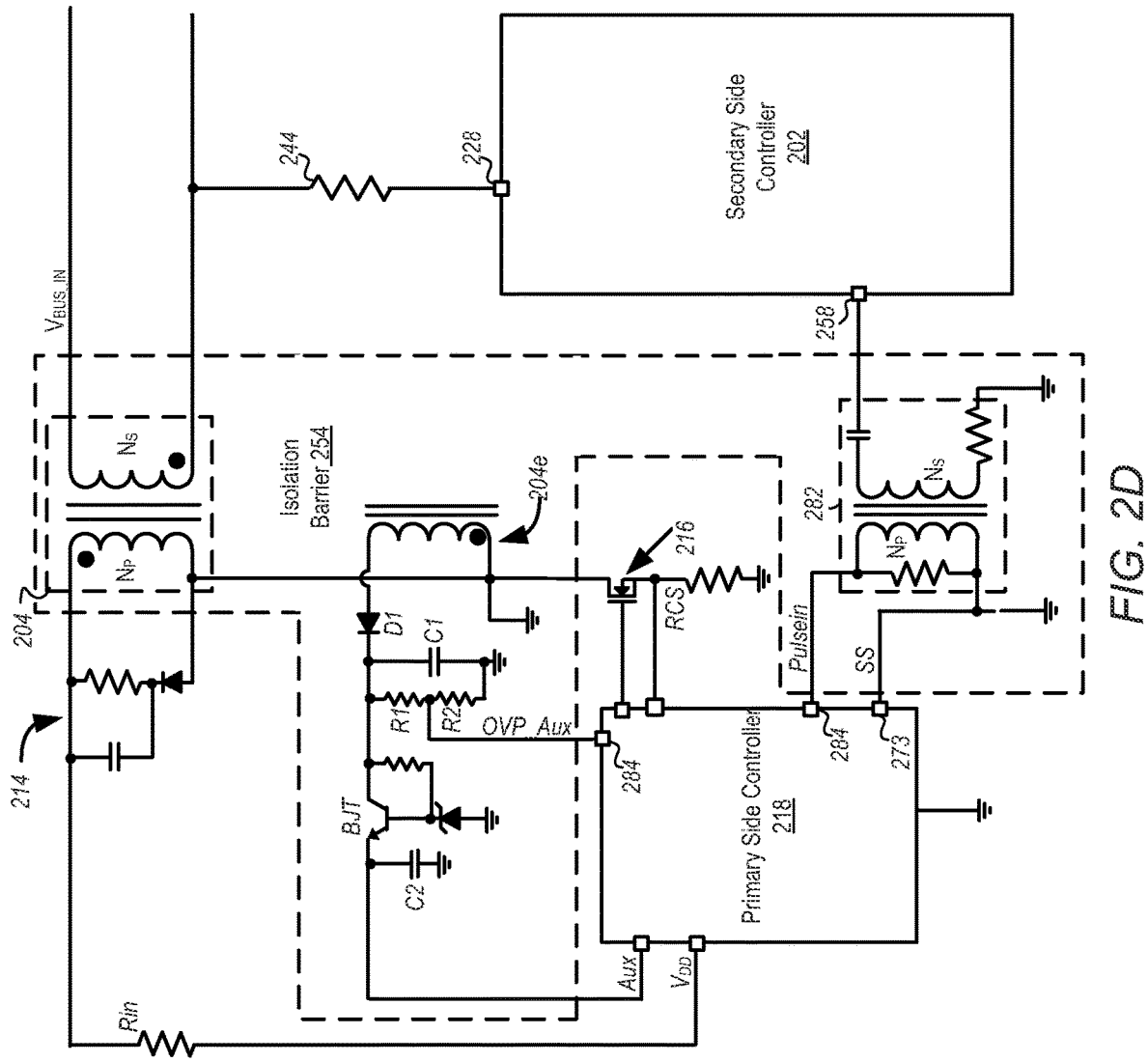
FIG. 2D is a schematic block diagram depicting another embodiment of the isolation barrier of FIG. 2A including a pulse transformer in accordance with the present disclosure.

FIG. 2D is a schematic block diagram depicting another embodiment of the isolation barrier of FIG. 2A including a pulse transformer 282 coupled between the PWM drive pin 258 of the secondary side controller 202 and a pulse_in pin 284 and a soft-start (SS) pin 273. The PWM drive pin 258 to the primary side controller 218 of the primary side controller 218 modulates the pulse width of the primary MOSFET in voltage mode control. In this architecture the primary side controller 218 engages the error amplifier 272 and the programmable ramp generator of the PWM circuit 264 to determine the pulse width of the PWM signal. This PWM signal is transferred from the secondary side controller 202 to the primary side controller 218 through the pulse transformer 282. This architecture, like that of FIG. 2C, also provides three key features: secondary side sensing and regulation, synchronous rectification, and charging port controller. The isolation barrier also includes an auxiliary coil of the transformer 204, which functions as a fly-back step-down transformer 204e to provide power to primary side controller 218 via an Aux pin. The step-down transformer 204e along with a diode D1 followed by capacitor C1 to ground stores the stepped-down-voltage which is then clipped by a bipolar junction transistor (BJT) structure and then coupled to the Aux pin. This additional circuit helps to reduce total power consumption of the AC-DC converter 200 as the primary side controller 218 is supplied through the Aux pin instead of by a separate power supply through another pin coupled to the first terminal 204a on the primary side 206 of the transformer 204 through Rin. A resistor divider R1, R2, connected to an over voltage protection (OVP)_AUX pin 284 of primary side controller 218 is used to sense a reflected voltage of VBUS_IN on the secondary side 208 via the step-down transformer 204e. With this VBUS_IN signal primary side controller 218 can disable PS 216, shown here as a PR_FET, using internal circuitry of the primary side controller.

Figure 2E:
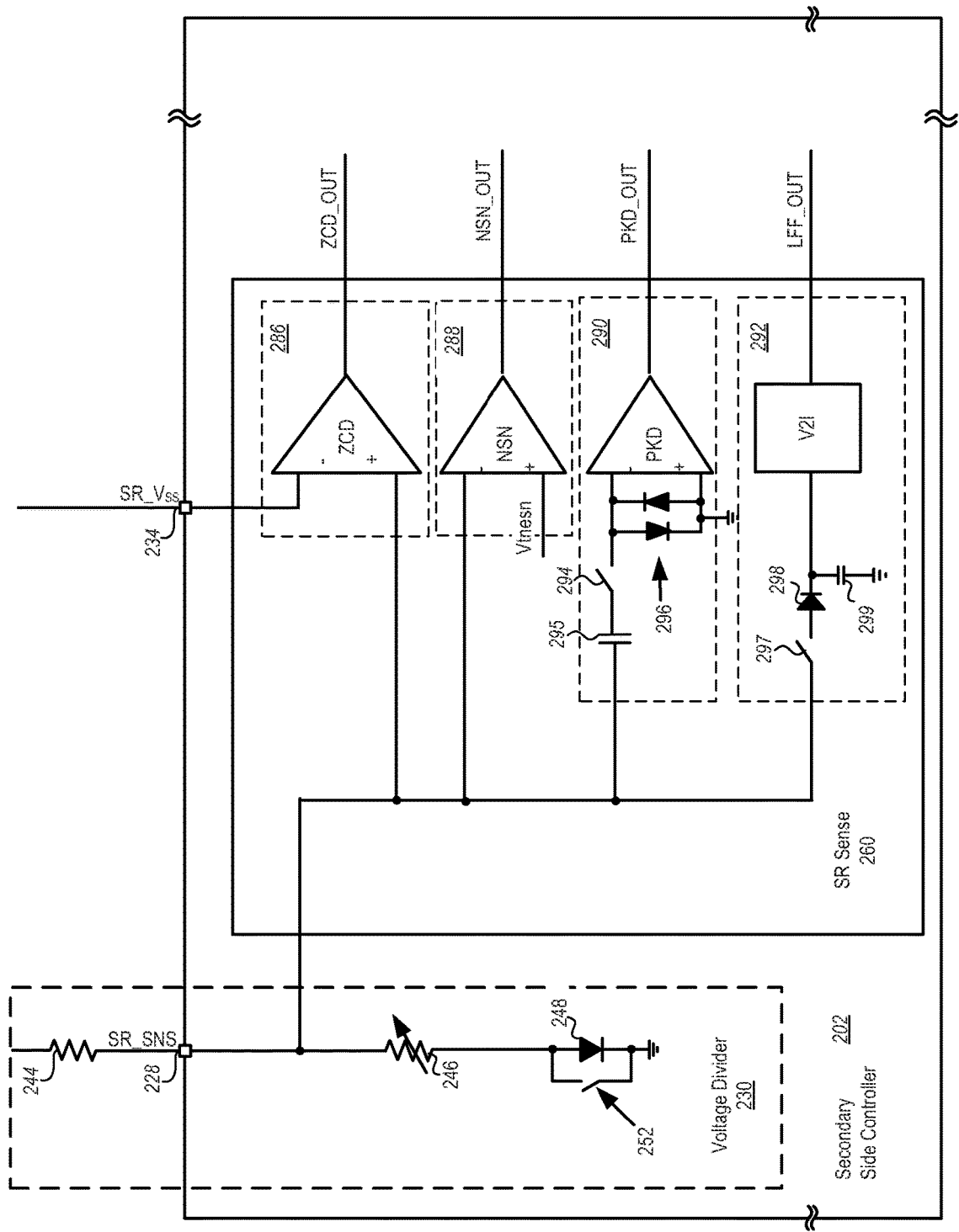
FIG. 2E is a schematic block diagram depicting of a portion of the secondary-side controller of FIG. 2B depicting an embodiment of the SR sense block in accordance with the present disclosure.

FIG. 2E is a schematic block diagram depicting of a portion of the secondary-side controller of FIG. 2B depicting an embodiment of the SR sense block 260 in accordance with the present disclosure. As shown in FIG. 2E, the SR sense block includes a zero-crossing detector (ZCD) block 286, a negative-sensing (NSN) block 288, a peak-detector (PKD) block 290, and Line-feed-forward (LFF) block 292, all integrally formed on a single IC with other components and elements of the secondary side controller 202.

The ZCD block 286 can include a comparator having a first, inverting input coupled through the SR-Vss pin 234 to the source node 226c of the SR 226, and a second, non-inverting input coupled to the SR-SNS pin 228 and through the voltage divider 230 to the drain node 226a of the SR. During the ZCD detection phase, where the SR_DRAIN 226a is at negative voltages and ramping towards 0V, the rectifier 248 is kept enabled without enabling switch 252 to allow no voltage division in voltage divider 230. This enables direct voltage of SR_DRAIN 226a at the non-inverting input 228 of the ZCD comparator 286. The comparator of the ZCD block 286 can be configured to generate a zero current signal (ZCD_OUT) to turn off the SR 226 when zero voltage is sensed on the SR-SNS pin 228 and SR_DRAIN pin 226a crossing without any voltage division. No voltage division enables precise detection of Zero-current (or voltage crossing of SR_DRAIN 226a which improves efficiency of the AC-DC converter 200.

The NSN block 288 can also include a comparator having a first, inverting input coupled to the SR-SNS pin 228 and through the voltage divider 230 to the drain node 226a of the SR 226, and a second, non-inverting input coupled to a negative reference voltage (Vtnesn) which can be anywhere from −700 mV to +200 mV. This reference voltage Vtnesn can be defined to desired negative voltage trip point at which the controller needs to turn-on the SR_GDRV 226b. An alternate method for negative reference voltage could be, for example, connecting non-inverting input coupled through the SR-Vss pin 234 to the source node 226c of the SR 226 and the comparator can have in-build offset to trip when SR-SNS pin 228 is at negative voltage. During the NSN detection phase, where the SR_DRAIN 226a is going from positive to negative voltages, the rectifier 248 is kept enabled without enabling switch 252 to allow no voltage division in voltage divider 230. This enables direct voltage of SR_DRAIN 226a at the inverting input 228 of the NSN comparator 288. The NSN comparator 288 generates a negative voltage signal (NSN_OUT) to turn-on the SR 226.

During power delivery on the secondary side, when the SR 226 turns-off, and as PS 216 has not yet turned-on, it results in LC sinusoidal oscillations on the SR_DRAIN 226a as well as inverted sinusoidal on the PR drain 204b terminal of the fly-back transformer 204. To improve AC-DC converter efficiency, primary switch 216 must be turned on when there is a Valley in these sinusoidal oscillations, which corresponds to Peak on the secondary SR_DRAIN 226a node. The PKD block 290 is the peak sensing block on the secondary side. The PKD block 290 can also include a comparator having a first, inverting input coupled to the SR-SNS pin 228 through a switch 294 and an internal capacitor 295, and from the SR-SNS pin to the drain node 226a of the SR 226 through the voltage divider 230, and a second, non-inverting input coupled to ground. Generally, as in the embodiment shown the PKD block 290 further includes a back to back connected diode circuit 296 across the first and second inputs to the comparator to detect the peak of the sinusoidal waveform seen on SR_SEN 228. The comparator is configured to generate a peak voltage detection signal (PKD_OUT), which can be coupled to the primary side controller 218 to turn on the PS 216 to enable a valley switching mode of operation. The switch 294 is kept off during NSN and ZCD detection phase to avoid capacitive load offered by PKD block, on SR_SEN 228 node, which reduces the delay in sensing NSN and ZCD and improves performance and efficiency of the AC-DC converter 200. The switch 294 is turned-on during Peak-detection function, by using a derived signal of ZCD_OUT as ZCD_OUT decides turning-off of SR FET 226, after which LC sinusoidal oscillation starts.

Finally, AC Line-Feed-Forward (LFF) block 292 can include a voltage-to-current (V2I) block, which is coupled through a switch 297, a sample and hold arrangement using diode element 298 along with charge-storage element (capacitor 299) to the SR-SNS pin 228 and through the voltage divider 230 to the drain node 226a of the SR 226. During the phase when primary switch 216 is turned on, the difference between node 204d and 204c of fly-back transformer develops a proportional reflected voltage of line-in rectified voltage on node 204a of transformer 204, in accordance to turn-ratio (N) of fly-back transformer 204. As node 204d is also coupled to SR_DRAIN 226a which is used as a sensing node insider secondary-side-controller 202 after a resistor divider 230, the node SR_SEN 228 also carries the line-in voltage information which is derived using LFF block 292. The line-in information can be used by secondary-side-controller 202 to alter the valley switching or PWM pulse-width to optimize the efficiency of the AC-DC converter 200 across variable AC line-in. The phase where primary switch 216 is turned-on and SR_DRAIN 226a gets reflected proportional voltage, is defined as feed-forward sensing phase and during this phase, switch 297 is turned-on to start sensing line-In voltage via SR_SEN 228 pin. At the same time, switch 252 is also turned on to bypass rectifier element 248 to allow exact resistive divided version of SR_DRAIN 226a to reach at the input of LFF block 292. The switch 297 is kept off during NSN and ZCD detection phases to avoid capacitive load offered by LFF block on SR_SEN 228 node, which helps to reduce the delay in sensing NSN and ZCD and improves performance and efficiency of the AC-DC converter 200. LFF block 292 is configured to generate a current signal (IFF_OUT) when the AC-DC converter 200 is operating in a feed-forward sensing mode. This IFF_OUT current then can be used to modulate PWM pulse-width as per line AC voltage, which improves performance and efficiency of the AC-DC converter over wide-range of AC input voltage range. The IFF_OUT current can also be converted to voltage which would be proportional to line AC input voltage and can be used for any function required on the secondary side controller, like for altering Valley at which primary FET 216 to be turned-on based on line AC voltage for same output power requirement, to improve performance of the AC-DC converter 200.

Figure 4:
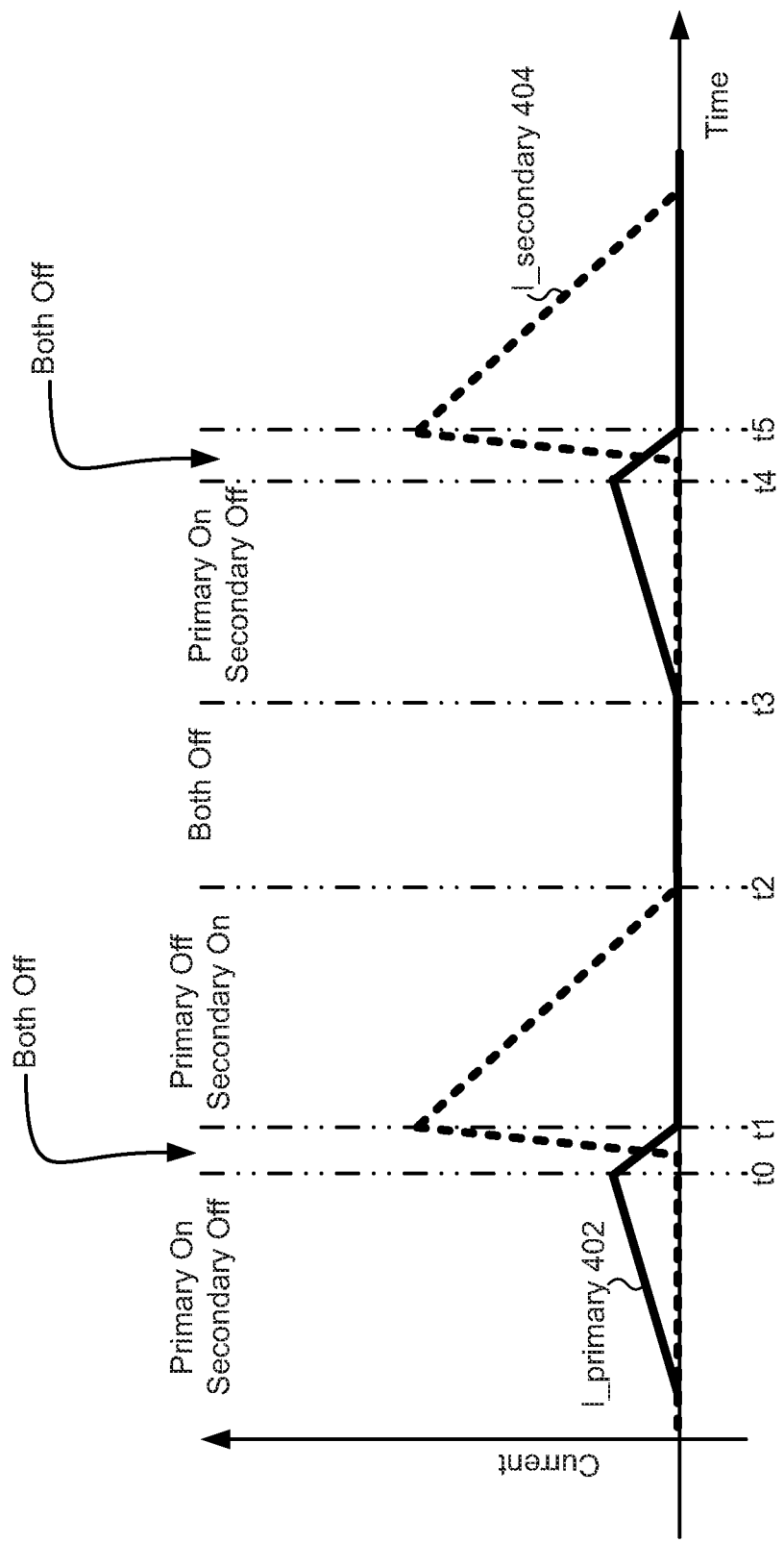
FIG. 4 is a diagram showing primary current (I_primary) and secondary current (I_secondary) over time in the circuit of FIG. 2A as operated by the method of FIG. 3.
Figure 5:
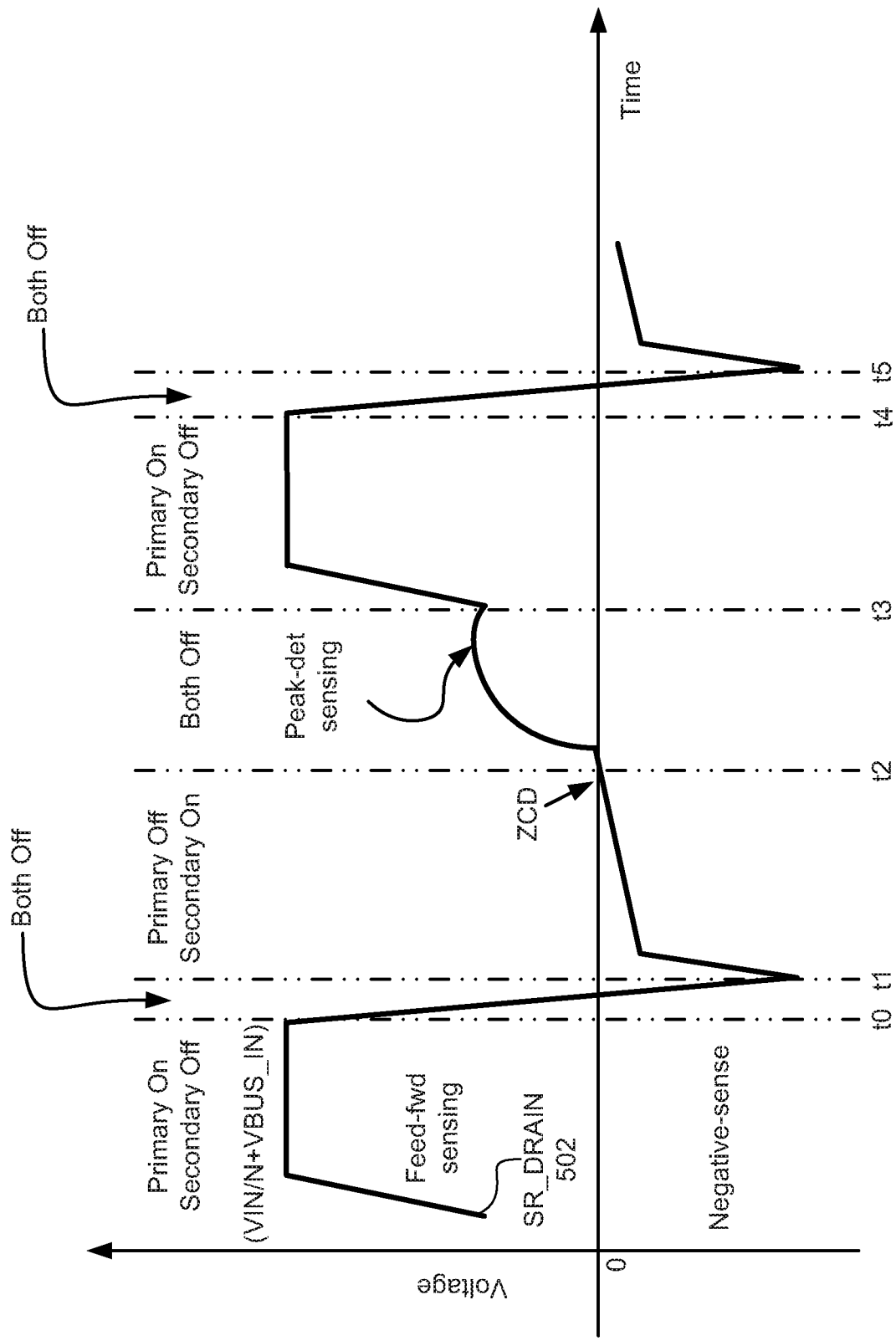
FIG. 5 is a diagram showing voltage on a drain node of a SR over time in the in the circuit of FIG. 2A when operated by the method of FIG. 3.

A method of operating an AC-DC converter having a secondary side controller including an IC having a single SR-SNS pin through which the IC is coupled to the drain of a SR through a voltage divider will now be described with reference to the flowchart of FIG. 3, and the graphs of FIGS. 4 and 5. FIG. 4 is a graph showing primary current (I_primary 402) and secondary current (I_secondary 404) in the circuit of FIGS. 2A-E when operated by the method of FIG. 3. FIG. 5 is a graph showing the resulting voltage 502 on the drain node of the SR when operated by the method of FIG. 3.

Figure 3:
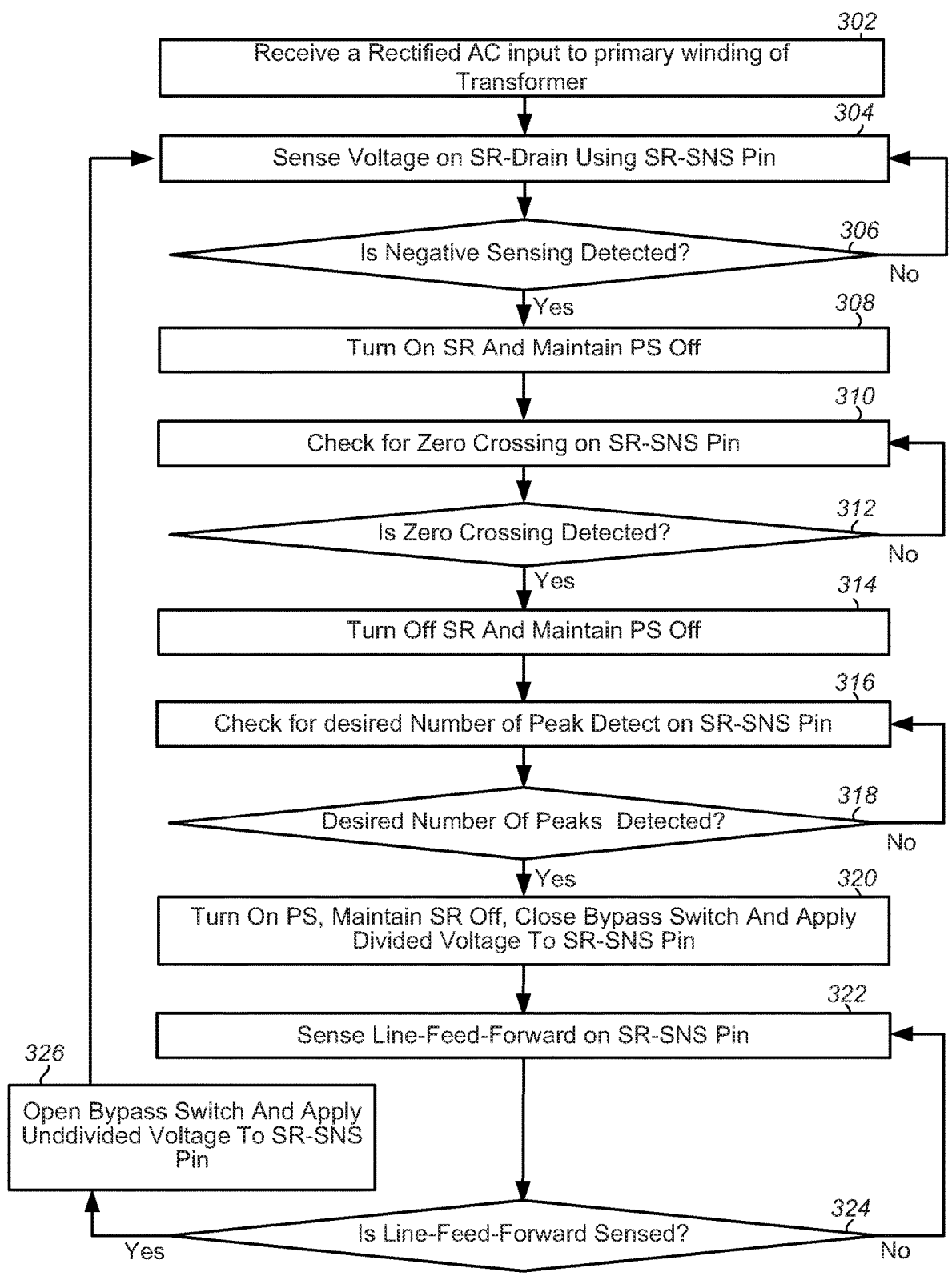
FIG. 3 is a flowchart illustrating an embodiment of a method for operating an AC-DC converter including a secondary-side controller and SR architecture in accordance with the present disclosure.

Referring to FIG. 3 and to FIGS. 2A and 2E the method begins with receiving a rectified AC input to the primary side 206 of the transformer 204 (302). A voltage on the drain 226a of the SR 226 is sensed through the single SR-SNS pin 228 (304). Next, it is determined if negative sensing is detected (306). Generally, determining if the AC-DC converter is operating in a negative sensing mode is accomplished by sensing an increasing negative voltage on the SR-SNS pin 228. If negative sensing is not detected step or block 304 is repeated and the voltage on the drain 226a of the SR 226 continues to be sensed through the single SR-SNS pin 228. If negative sensing is detected, the SR 226 is turned on while the power switch or PS 216 on the primary side is 206 of the transformer 204 is maintained off (308).

Next, a check is performed for a zero crossing on SR-SNS pin 228 using the ZCD block 286 in the secondary side controller 202 (310), and it is determined if a zero-crossing is detected (312). If a zero crossing is not detected step or block 310 is repeated to continue to check for a zero crossing on the SR-SNS pin 228. If a zero crossing is detected, the SR 226 is turned off and the PS 216 is maintained off (314).

A check is then performed for a predetermined or desired number of peaks of a predetermined or desired peak voltage detected on SR-SNS pin 228 using the PKD block 290 in the secondary side controller 202 (316), and it is determined if the desired number of peaks is detected (318). If the desired number of peaks is not detected step or block 316 is repeated to continue to check for the desired number of peaks. If the desired number of peaks is detected, the SR 226 is maintained off, the PS 216 is turned on (320), and the bypass switch 252 closed to apply a divided voltage to the SR-SNS pin 228.

Next, a check is performed to sense if the AC-DC converter 200 is operating in a Line-Feed-Forward (LFF) sensing mode (322), and a determination made whether or not LFF is sensed (324). Generally, determining if the AC-DC converter 200 is operating in a LFF sensing mode is accomplished by sensing a rising or steady positive voltage on drain 226a of the SR 226 applied through the single SR-SNS pin 228 using the LFF block 292. If the AC-DC converter 200 is not operating in a LFF sensing mode, step or block 322 is repeated to continue to check for LFF sensing. If it is determined the AD-DC converter is operating in a LFF sensing mode, bypass switch 252 is opened so that the voltage applied to the secondary side controller 202 through the single SR-SNS pin 228 is undivided by the voltage divider 230 (326), and step or block 304 is repeated to sense voltage on the drain 226a of the SR 226 through the single SR-SNS pin 228.

As noted above, to achieve high efficiency in AC-DC converters a voltage valley the primary side must be sensed and a primary power switch or PS_FET must be turned on to minimize switching loss when the converter is operating in a discontinuous conduction mode (DCM) or quasi-resonant (QR) mode. This method of switching on the PS_FET at a valley on the primary side is known as 'valley switching'. However, detecting a valley on primary side is equivalent to detecting a peak on secondary side.

Thus, in another aspect the present disclosure is directed to a peak detect circuit and method of operating the same to enable detection of peak voltages on the secondary side more accurately and at lower peak voltage values than possible heretofore. Embodiments of such a AC-DC converter having SR architecture and a secondary side controller including an improved a peak detect block or module will now be described with reference to FIGS. 6 through 12.

Figure 6:
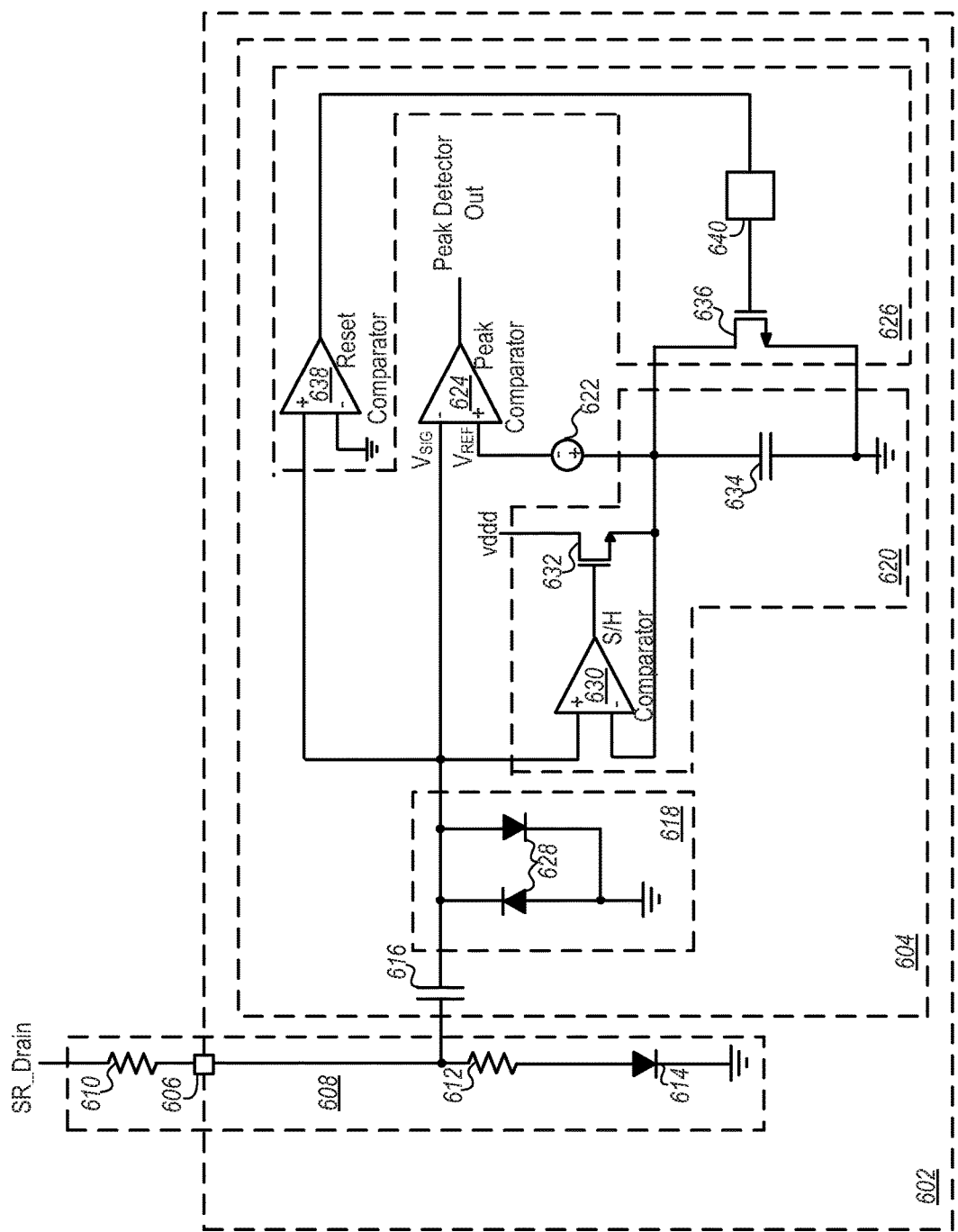
FIG. 6 is a schematic block diagram depicting a portion of a secondary-side controller including an embodiment of a peak detect circuit with improved accuracy of valley detection on primary side in accordance with the present disclosure.

FIG. 6 illustrates a portion of a secondary-side controller 602 including one embodiment of a peak detect (PKD) module 604 for use in a AC-DC converter having a SR architecture. Referring to FIG. 6, in the embodiment shown the secondary-side controller 602 is implemented as an integrated circuit (IC) including a single SR sense (SR-SNS) pin 606 through which the secondary-side controller is coupled to a drain of a SR on a secondary side of a AC-DC converter (not shown in this figure). As shown in FIG. 6 the single SR-SNS pin 606 is coupled to the drain of the SR through a voltage divider 608 to limit a maximum voltage on the SR_SNS pin and enable the secondary side controller 602 to be made with non-high voltage devices, and using standard, low voltage technologies. Generally, the voltage divider 608 includes an external resistive element (Rext 610), and an internal resistive element (Rint 612) coupled in series with an internal rectifier 614 configured to prevent voltage division when the voltage at the SR_SNS pin is close to ground level. Although not shown in this figure it will be understood that the internal resistive element (Rint 612) can include a variable resistance set by the manufacturer based on either desired input or output voltages. It will further be understood that FIG. 6 illustrates only the portion of the secondary-side controller 602 necessary to describe the PKD module 604, and that the secondary-side controller can and generally does further include additional blocks, circuits and elements, as described above with reference to FIGS. 2A through 2E.

Referring to FIG. 6, the PKD module 604 includes a sensing capacitor 616 and a clamping circuit 618 through which a sinusoidal input signal ($V_{SIG}$) is coupled from the voltage divider 608 to other circuits and elements of the PKD module; a sample and hold (S/H) circuit 620 to sample the sinusoidal input and to hold or store a peak sampled voltage ($V_{S/H\_cap}$); a direct current (DC) offset voltage supply 622 to subtract a DC offset voltage from the peak sampled voltage to generate a reference voltage ($V_{REF}$); a peak comparator 624 to compare the sinusoidal input signal ($V_{SIG}$) to the reference voltage ($V_{REF}$) and generate a peak voltage detection signal (PKD_OUT); and a reset circuit 626 to discharge a S/H capacitor in the (S/H) circuit 620 in preparation for the next sample and hold operation.

The clamping circuit 618 can include a pair of rectifying elements, such as diodes 628, connected back-to-back in parallel and between one terminal of the sensing capacitor 616 and a signal ground, as shown in FIG. 6, to clamp the sinusoidal input signal (VSIG) to about +/−0.7V The S/H circuit 620 includes a S/H opamp 630 having a first, non-inverting input coupled to an output of the clamping circuit 618, an output coupled to a control terminal of a source follower transistor 632 coupled between a supply voltage (vddd) and an output of the S/H circuit, and a S/H capacitor 634 having a first terminal coupled to the output of the S/H circuit and to a second, inverting input of the S/H opamp, and a second terminal coupled to a signal ground in the IC.

The DC offset voltage circuit 622 coupled between the output of the S/H circuit 620 and the reference voltage ($V_{REF}$) input of the peak comparator 624 to subtract a DC offset voltage from the peak sampled voltage ($V_{S/H\_cap}$) to generate the reference voltage ($V_{REF}$). Generally, the DC offset voltage circuit 622 is programmable to adjust accuracy versus signal-to-noise ratio (SNR) of the PKD module 604, and/or to set or adjust a minimum peak voltage that the PKD circuit is capable of detecting. More preferably, the DC offset voltage circuit 622 is programed to enable the PKD module 604 to accurately sense a peak voltage within about 50 mV from an actual peak of the voltage on the input signal ($V_{SIG}$).

Alternatively, the DC offset voltage circuit 622 can be implemented as part of the peak detect comparator 624.

The peak comparator 624 includes a first, inverting input coupled to the output of the clamping circuit 618 to receive the sinusoidal input signal ($V_{SIG}$), and a second, non-inverting input coupled to the DC offset voltage supply 622 to receive the reference voltage ($V_{REF}$). The peak comparator 624 compares the sinusoidal input signal ($V_{SIG}$) to the reference voltage ($V_{REF}$), and when $V_{SIG}$ goes below the $V_{REF}$ outputs a peak voltage detection signal (PKD_OUT), which is used by the secondary side controller 602, or coupled to a primary side controller (not shown) to turn on the primary power switch or PS_FET to minimize switching loss when the AC-DC converter is operating in a (DCM-QR) mode.

The reset circuit 626 includes a reset switch 636 coupled in parallel with the S/H capacitor 634 and operated by a reset comparator 638 and, in some embodiments, a reset timer element 640 to discharge the S/H capacitor in preparation for the next sample and hold operation. Where including the reset timer element 640 is configured to generate and apply a reset pulse for a duration of about 25 nanoseconds (ns) and reset the S/H capacitor 634 in response to the output from the reset comparator 638 going high. The reset comparator 638 is a zero-crossing detector and includes a first, non-inverting input coupled to the output of the clamping circuit 618 to receive the sinusoidal input signal ($V_{SIG}$), and a second, inverting input coupled to signal ground.

A method of operating a AC-DC converter having SR architecture and a secondary side controller including a peak detect circuit as shown in FIG. 6 with improved accuracy of valley detection on primary side will now be described with reference to the flowchart of FIG. 7, and the graphs of FIG. 8.

Figure 7:
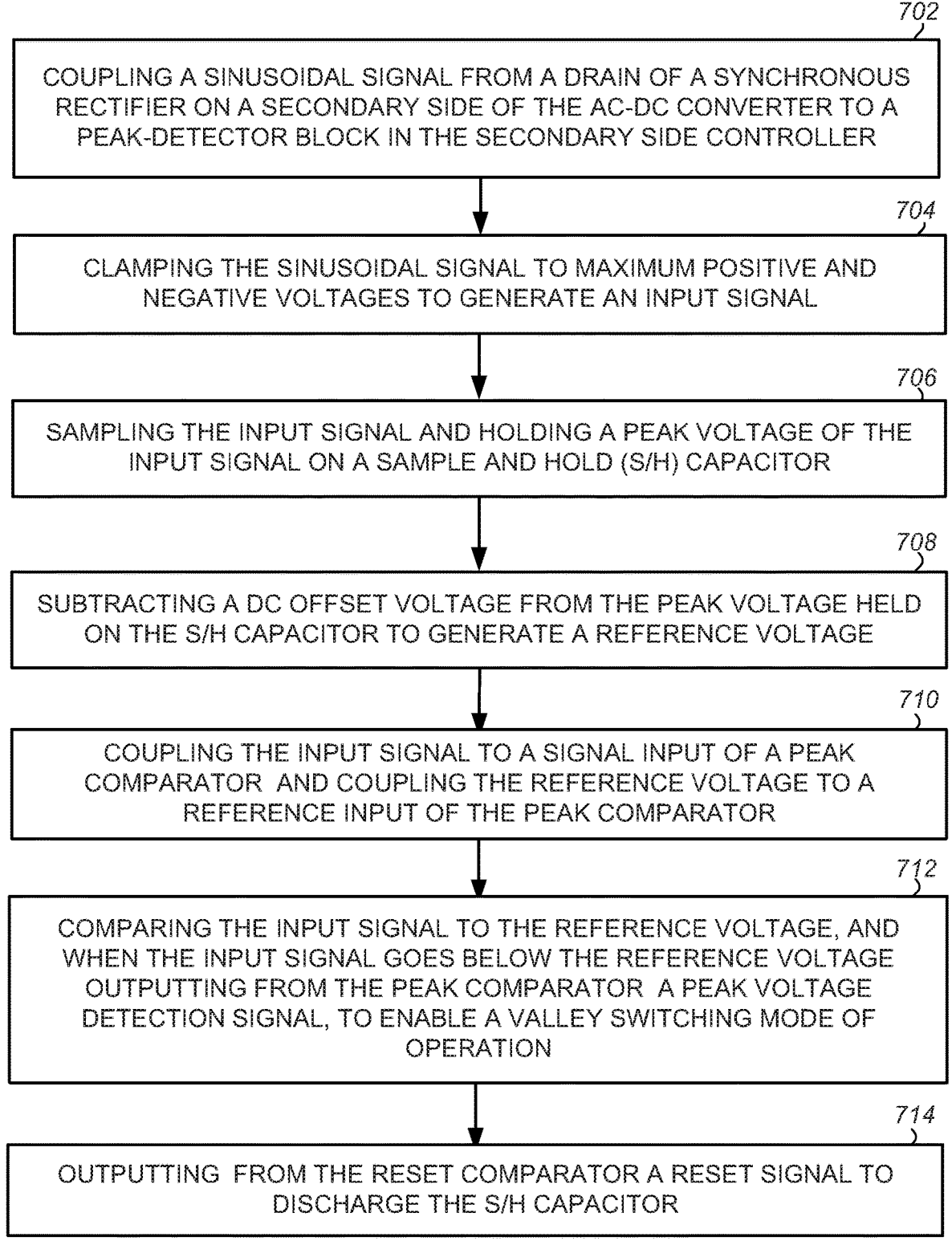
FIG. 7 is a flowchart illustrating an embodiment of a method for operating an AC-DC converter including the peak detect circuit of FIG. 7 in accordance with the present disclosure.
Figure 8:
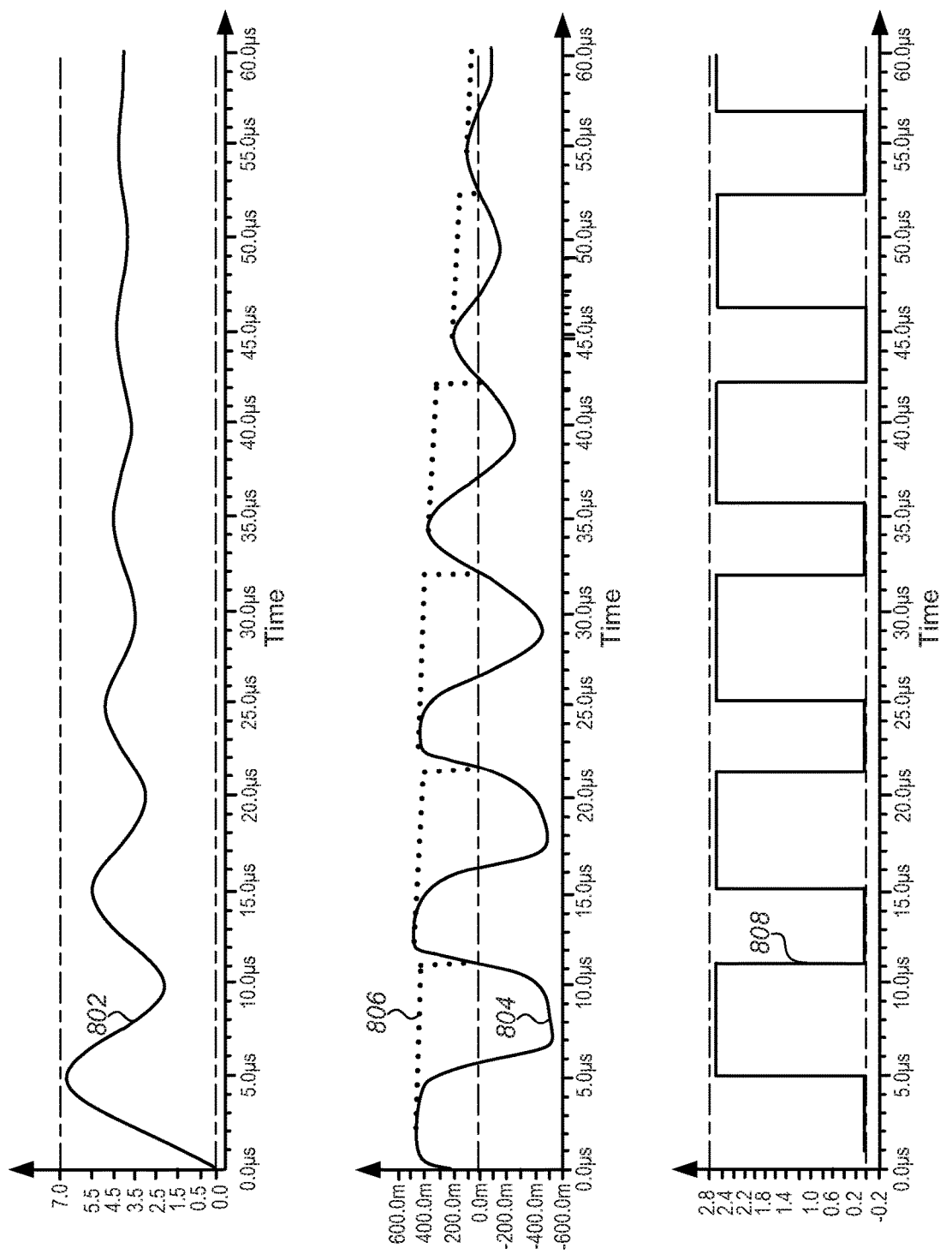
FIG. 8 includes a number of diagrams showing voltages over time for the peak detect circuit of FIG. 6 operated by the method of FIG. 7.

Referring to FIGS. 7 and 8 the method begins with coupling a sinusoidal signal from a drain of the SR on the secondary side of the AC-DC converter to a PKD module in the secondary side controller (702). Generally, as shown in FIG. 6, the drain of the SR is coupled to a single SR-SNS pin of the secondary side controller through a voltage divider including an external resistive element (Rext), and an internal resistive element (Rint), and coupling the sinusoidal signal from the drain of the SR to the secondary side controller includes dividing the voltage of the sinusoidal signal by a factor equal to the ratio of Rint/(Rint+Rext) to generate a sinusoidal input signal on the SR-SNS pin ($V_{SR-SNS}$) less than the voltage on the secondary side of the transformer. Preferably, the external and internal resistive elements have a resistance selected or adjusted to provide a maximum input voltage to the secondary side controller of less than 21.5V. The top graph of FIG. 8 shows a voltage on the SR-SNS pin ($V_{SR-SNS}$ 802) in the AC-DC converter of FIG. 6 when operated by the method of FIG. 7.

Next, the sinusoidal input signal to the SR-SNS pin is coupled to a clamping circuit and clamped to maximum positive and negative voltages to generate an input signal ($V_{SIG}$) (704). Generally, the sinusoidal input signal to the SR-SNS pin is coupled to the clamping circuit through a sensing capacitor. The clamping circuit can include a pair of rectifying elements, such as diodes, connected back-to-back in parallel and coupled between one terminal of the sensing capacitor and a signal ground, as shown in FIG. 6. The second or middle graph of FIG. 8 shows the input signal (VSIG 804) output from clamping circuit for the AC-DC converter of FIG. 6 when operated by the method of FIG. 7.

The input signal ($V_{SIG}$) is then sampled by an S/H circuit and a peak voltage of the input signal held or stored on a S/H capacitor (706). The second or middle graph of FIG. 8 shows the sampled peak voltage ($V_{S/H\_cap}$ 806) held on the S/H capacitor. A DC offset voltage is then subtracted from the sampled peak voltage ($V_{S/H\_cap}$) held on the S/H capacitor to generate a reference voltage ($V_{REF}$) (708). As noted above, preferably the DC offset voltage is supplied by a programmable DC offset voltage circuit which can be programed or adjusted to tradeoff accuracy versus signal-to-noise ratio of the PKD circuit, and to set a minimum peak voltage that the PKD circuit is capable of detecting. More preferably, the DC offset voltage is programed to enable the PKD circuit to accurately sense a peak voltage within about 50 mV from an actual peak of the voltage on the input signal ($V_{SIG}$).

Next, the input signal (VSIG 804) from clamping circuit is coupled to a first or signal input of the peak comparator, and the reference voltage ($V_{REF}$) from the DC offset voltage circuit coupled to a second or reference input of the peak comparator (710). The input signal (VSIG 804) is then compared to the reference voltage ($V_{REF}$) by the peak comparator, and when the input signal goes below the reference voltage the peak comparator outputs a peak voltage detection signal (PKD_OUT), to enable a valley switching mode of operation (712). The third or lower graph of FIG. 8 shows the peak voltage detection signal (PKD_OUT 808) for the AC-DC converter of FIG. 6 when operated by the method of FIG. 7.

Finally, where the PKD module further includes a reset circuit having a reset switch connected in parallel with the S/H capacitor, and a reset comparator, and the method further includes outputting from the reset comparator a reset signal followed by a timer circuit which generates a pulse for about 25 ns to discharge the S/H capacitor at the beginning of each cycle so that S/H capacitor is ready to store the next peak voltage sensed on the SR-SNS pin (714).

Figure 9:
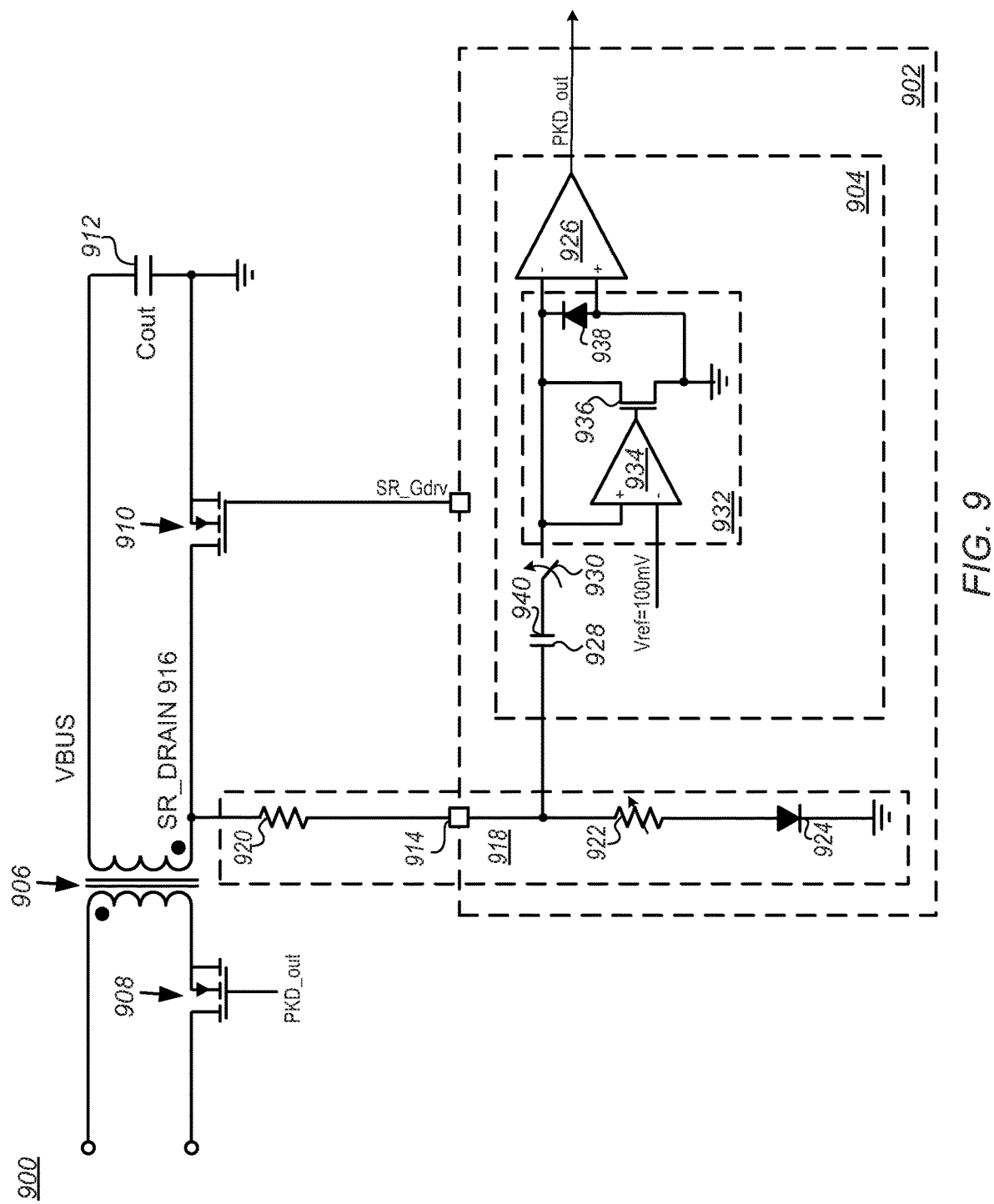
FIG. 9 is a schematic block diagram depicting a portion of a secondary-side controller including a peak detect circuit including a closed loop operational amplifier to define a voltage at one terminal of a sensing capacitor in accordance with another embodiment of the present disclosure.

FIG. 9 is a schematic block diagram depicting a portion of a AC-DC converter 900 with an SR architecture and another embodiment of a secondary-side controller 902 including a peak detect (PKD) module 904 to enable valley switching or DCM-QR mode operation.

Referring to FIG. 9 the AC-DC converter 900, generally includes a transformer 906, an active rectification element or power switch (PS), such as a PS field effect transistor (PS_FET 908) on a primary side of the transformer, and on a secondary side of the transformer a synchronous rectifier (SR), such as a SR field effect transistor (SR_FET 910), and an output filter or capacitor 912. The secondary side controller 902 is realized or implemented as single integrated circuit (IC), or as a number of ICs packaged in a single IC package and includes a single SR-SNS pin 914 through which it is coupled to a drain 916 of the SR 910. The SR-SNS pin 914 is coupled to the drain 916 of the SR 910 through a voltage divider 918 including circuit elements both internal and external to the IC of the secondary side controller 902. Generally, the voltage divider 918 includes an external resistive element (Rext 920), and an internal resistive element (Rint 922) coupled in series with an internal rectifier 924 configured to prevent voltage division when the SR_SNS pin voltage is near the ground voltage. In some embodiments, such as that shown, the internal resistive element (Rint 922) can include a variable resistance element with a resistance set by the manufacturer based on either desired input or output voltages. Although not shown in this figure it will be understood that FIG. 9 illustrates only the portion of the secondary-side controller 902 necessary to describe the PKD module 904, and that the secondary-side controller can and generally does further include additional blocks, circuits and elements, as described above with reference to FIGS. 2A through 2E.

The PKD module 904 includes a peak comparator 926 with an inverting signal input coupled to the single SR-SNS pin 916 through a sensing capacitor 928 and a peak detect enable (PKD_enable) switch 930, a non-inverting reference input coupled to signal ground, and an output to output a peak voltage detection signal (PKD_OUT), to enable a valley switching mode of operation. The PKD module 904 further includes a clamping circuit 932 including a closed loop operational amplifier (OPAMP 934) having a first, non-inverting input coupled to the single SR-SNS pin 916 through the sensing capacitor 928 and PKD_enable switch 930, a second, inverting input coupled to a reference voltage ($V_{REF}$). An output of the OPAMP 934 is coupled to a control terminal of a switch, such as a NMOS transistor 936 coupled between the inverting signal input of the peak comparator 926 and signal ground. The clamping circuit 932 further includes a rectifying element 938 coupled between the signal input and the reference input of the peak comparator 926.

In valley switching or DCM mode of operation, the closed loop OPAMP 934 defines the voltage at a negative terminal 940 of the sensing capacitor 928, which in turn defines a minimum peak value to be detected. Generally, the minimum peak value is the same as the VREF applied to the OPAMP 934, which is 100 mV in FIG. 9. When the swing of the sinusoidal input signal ($V_{SIG}$) is in positive direction at the SR-SNS pin 914, the negative terminal 940 of the sensing capacitor 928 is held at VREF as the current flowing into the sensing capacitor is sunk by the OPAMP 934. When the signal swing is in a negative direction at the SR-SNS pin 914 the negative terminal 940 of the sensing capacitor 928 swings down from 100 mv towards 0 Volts until it is finally clamped to −0.7V by the diode 938 present between the input terminals of the peak comparator 926. The peak detect comparator 926 then signals high whenever the negative terminal 940 of the sensing capacitor 928 crosses zero volts. Thus, enabling the peak in the sinusoidal input signal ($V_{SIG}$) to be detected within about 100 mV from an actual peak resulting in accuracy of valley detection on primary side given by the following equation:

$$0.1V*\text{Res-ratio}*\text{transformer-turn-ratio}$$

where Res-ratio is the ratio of the Rext to Rint and transformer turn ratio is the turn ratio between the primary and secondary of the transformer.

Figure 10A:
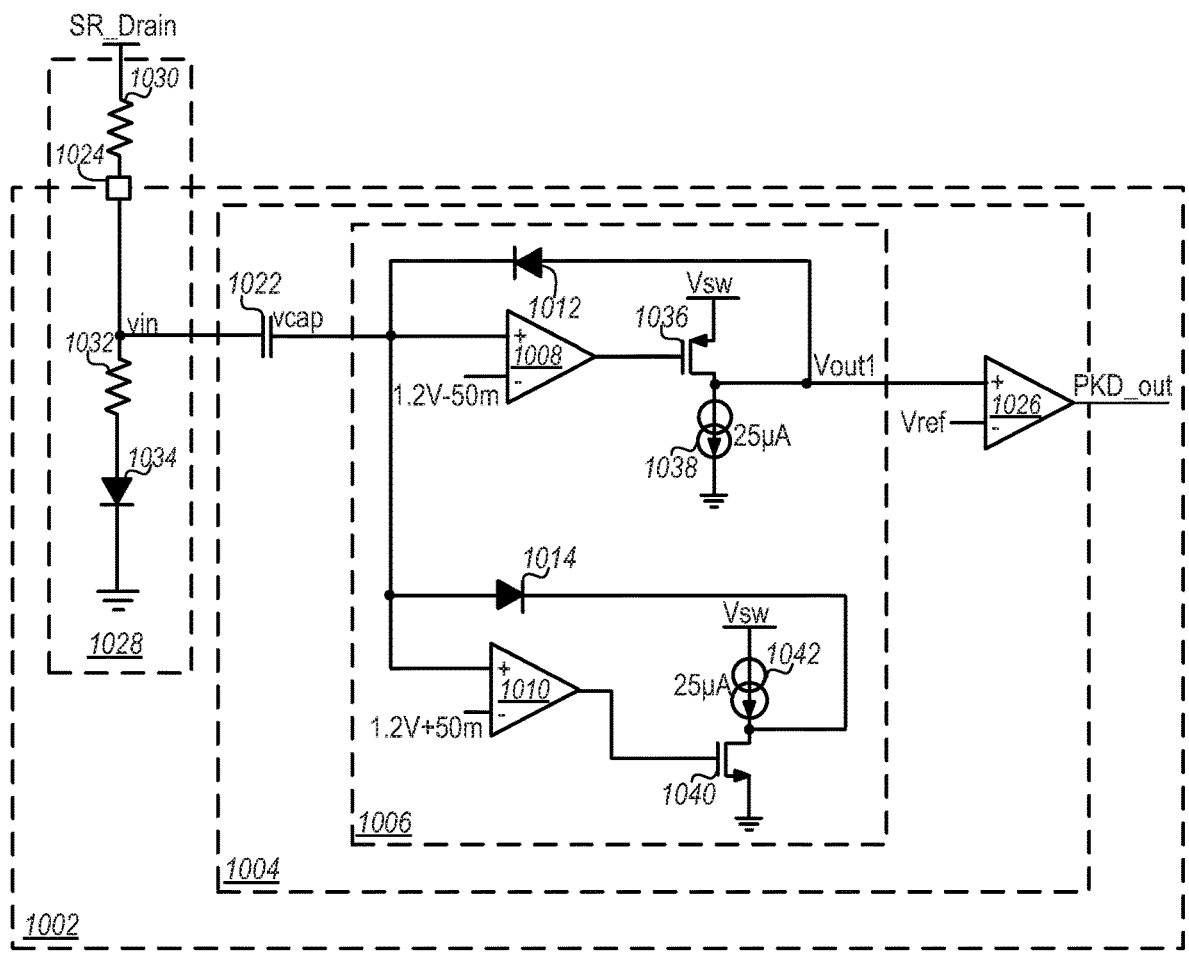
FIG. 10A is a schematic block diagram depicting a peak detect circuit including a clamping amplifier with diode feedback in accordance with another embodiment of the present disclosure.
Figure 10B:
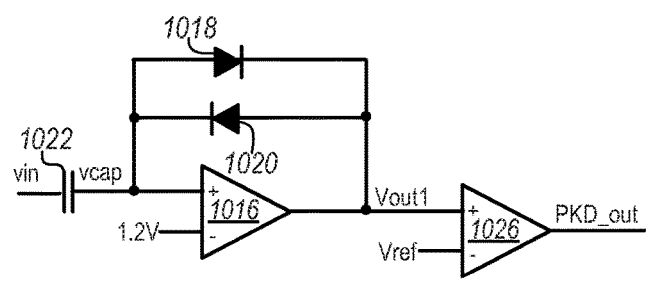
FIG. 10B is a schematic block diagram of the peak detect circuit of FIG. 10A with an amplifier using a pair of back to back diodes in accordance with another embodiment of the present disclosure.
Figure 11:
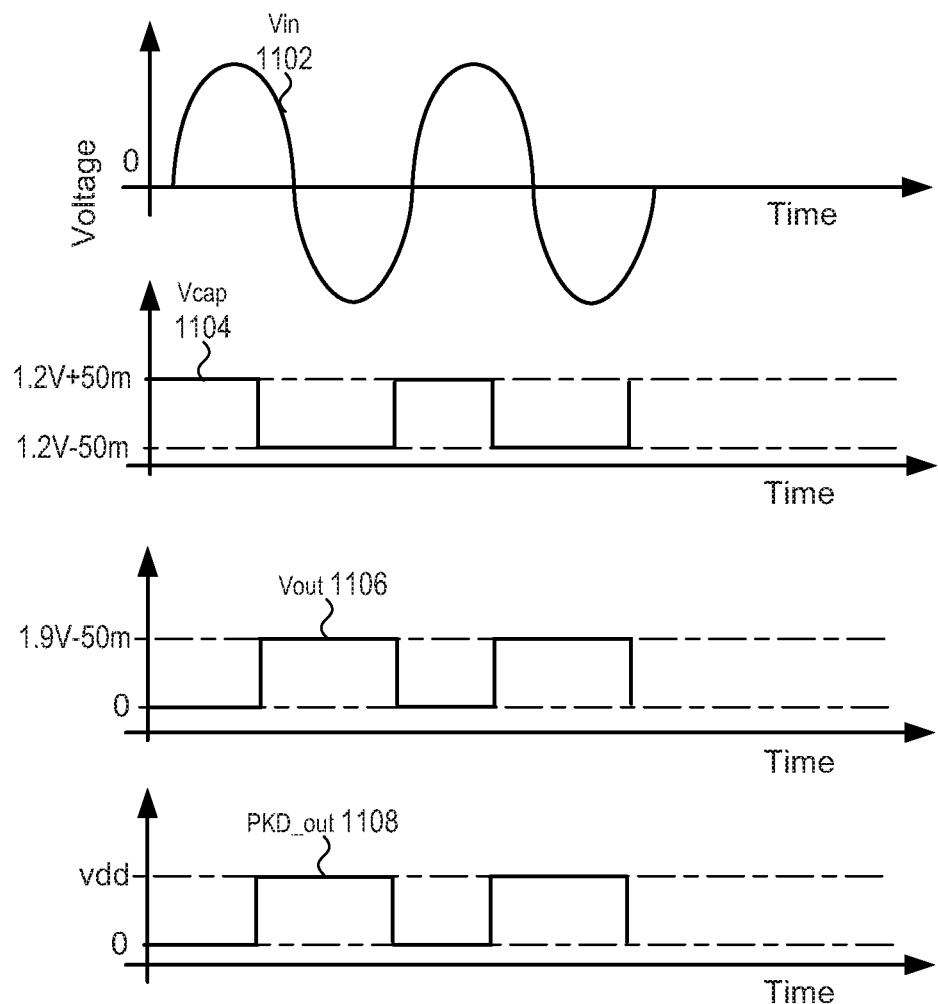
FIG. 11 includes diagrams showing input and output signals of the peak detect circuit of FIGS. 10A and 10B.

Other embodiments of a secondary-side controller including a peak detect (PKD) module to enable valley switching mode operation will now be described with reference to FIGS. 10A and 10B, and FIG. 11. FIG. 10A is a schematic block diagram depicting a portion of a secondary side controller 1002 having a peak detect module or module (PKD module 1004) including a clamping circuit 1006 with two closed loop operational amplifiers (OPAMPs 1008, 1010) each with a diode 1012, 1014, in a feedback path. FIG. 10B is an alternative embodiment of the clamping circuit 1006 of FIG. 10A including a single operational amplifier (OPAMP 1016) with a feedback loop including a pair of diodes 1018, 1020, FIG. 10B connected in parallel in a back-to-back configuration. FIG. 11 includes diagrams showing input and output signals of the peak detect circuit of FIGS. 10A and 10B.

Referring to FIG. 10A the secondary side controller 1002 includes a sensing capacitor 1022 through which the clamping circuit 1006 is coupled to a SR-SNS pin 1024, and a peak comparator 1026 having a first, non-inverting input coupled to an output of the clamping circuit, a second, inverting input coupled to a fixed, reference voltage, shown in this embodiment as Vref (1.2 VDC), and an output to output a peak voltage detection signal (PKD_OUT). Generally, the SR-SNS pin 1024 is coupled to a drain of a SR (not shown) through a voltage divider 1028. As in the embodiments described above, the voltage divider 1028 includes an external resistive element (Rext 1030), and an internal resistive element (Rint 1032) coupled in series with an internal rectifier 1034 configured to prevent voltage division when the voltage at the SR_SNS pin is close to ground level. In some embodiments, the internal resistive element (Rint 1032) can include a variable resistance element with a resistance set by the manufacturer based on either desired input or output voltages.

In addition to the OPAMPs 1008, 1010, the clamping circuit 1006 further includes a first transistor 1036 controlled by an output of the first OPAMP coupled between switch voltage source (Vsw) and a first current source 1038, and a second transistor 1040 controlled by an output of the second OPAMP coupled between $V_{gnd}$ and a second current source 1042.

Referring to FIGS. 10A and 11 in operation an input voltage (Vin 1102) is applied to the sensing capacitor 1022 through the voltage divider 1028. The voltage on the sensing capacitor 1022 (Vcap 1104) is clamped to 1.2V+/−50 mV by the 1012, 1014, in the feedback loops of OPAMPs 1008, 1010. The OPAMPs 1008, 1010 provide either a current source or a current sink. This can be achieved using amplifier with higher drive strength or class AB amplifier. In particular, when Vin 1102 changes the direction from high to low an output (Vout1 1106) from OPAMP 1008 goes from 0V to 1.2V-50 mV plus a voltage across diode 1012 (Vdiode), 0.7 in the embodiment shown to provide a Vout1 of 1.9V-50 mV. The peak comparator 1026 is then used to compare the Vout1 to a reference voltage ($V_{REF}$) and provide peak voltage detection signal (PKD_OUT 1108). In the embodiment shown the reference voltage ($V_{REF}$) is 1.2V. Preferably, the switch voltage source (Vsw) is programmable and can be adjusted to detect different peak amplitudes of the input voltage. In the embodiment shown, Vsw=25 mv and the peak voltage on the secondary side can be detected within 50 mV from an actual peak voltage, resulting in accuracy of valley detection on primary side accuracy of valley detection on primary side given by the following equation:

$$0.05V * Res\text{-}ratio * transformer\text{-}turn\text{-}ratio$$

where Res-ratio is the ratio of the Rext to Rint.

Figure 12A:
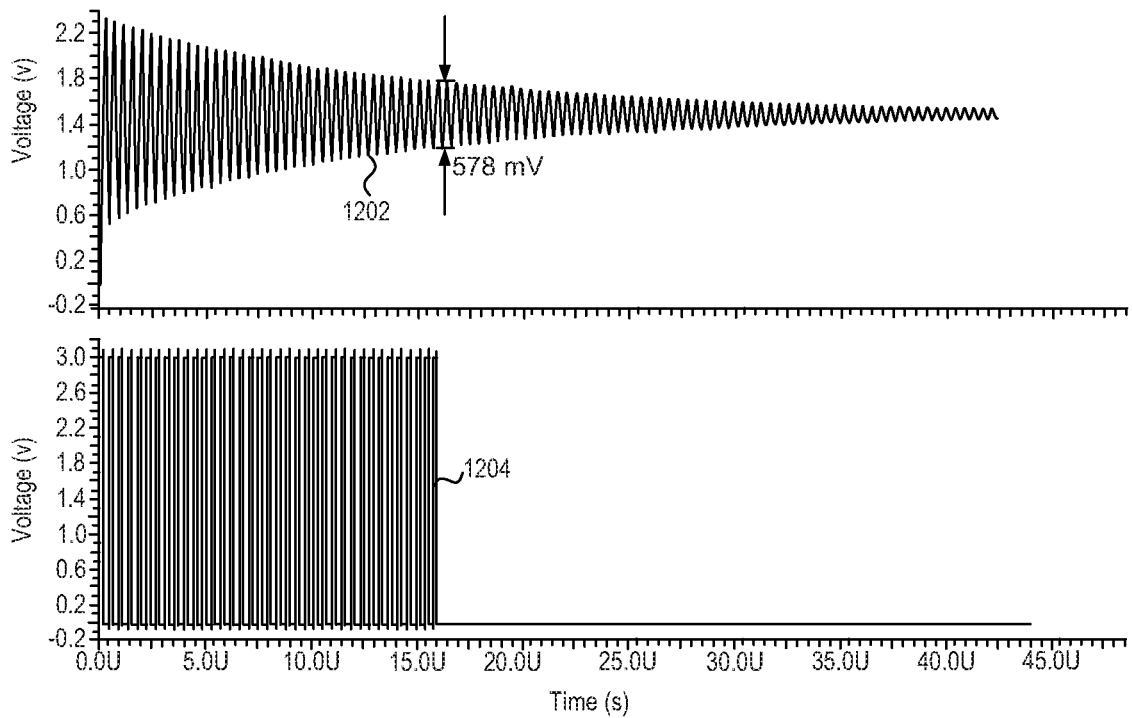
FIGS. 12A and 12B are diagrams of input voltages and output signals over time for a conventional peak detect circuit and a circuit of the present disclosure, illustrating the ability of the peak detect circuit and method of the present disclosure to detect peaks at lower peak values.
Figure 12B:
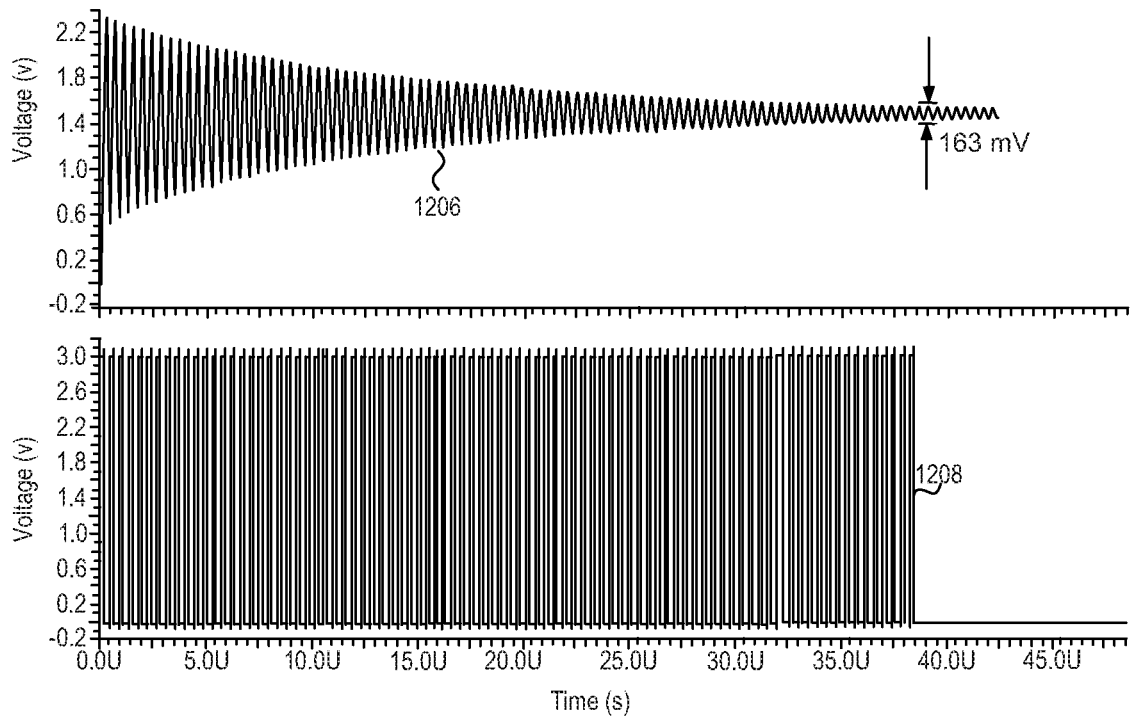

FIGS. 12A and 12B are diagrams of input voltages and output signals over time for a conventional peak detect circuit and a circuit of the present disclosure, illustrating the ability of the peak detect circuit and method of the present disclosure to detect peaks at lower peak values. In particular, the top timing and voltage plot of FIG. 12A shows a sinusoidal input signal 1202 to a conventional peak detector circuit consisting of a passive diode clamping circuit and a comparator configured to detect a peak voltage on the secondary side of a AC-DC converter based on zero crossing detection when a slope of the input changes by comparing the clamped sinusoidal input signal to a signal ground. The bottom timing and voltage plot of FIG. 12A shows a peak voltage detection signal 1204 from the conventional peak detector circuit. Referring to FIG. 12A it is seen that the conventional peak detector circuit is unable to detect peaks in the sinusoidal input signal below peak to peak values of about 578 mV.

FIG. 12B shows a sinusoidal input signal 1206 and a peak voltage detection signal 1208 from a peak detect circuit according to an embodiment of the present disclosure. Referring to FIG. 12B it is seen that in contrast to the conventional peak detector circuit, a peak detector circuit, such as that disclosed in FIG. 6, 9 or 10A, is capable of accurately detecting peaks in a sinusoidal input signal with minimum peak to peak values of 163 mV, thereby enabling a AC-DC converter to be operated longer and more efficiently in valley switching mode of operation.

Thus, a flyback AC-DC converter with secondary side control, and SR architecture, and methods for operating the same have been disclosed. Embodiments of the present invention have been described above with the aid of functional and schematic block diagrams illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be understood that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. An integrated circuit (IC) controller comprising:
 a SR-SNS pin to sense a voltage at a synchronous rectifier (SR) on a secondary side of an alternating current-direct current (AC-DC) converter; and
 a peak-detector block coupled to the SR-SNS pin to detect peak voltages sensed on the SR-SNS pin, the peak-detector block comprising:
  a peak comparator coupled to the SR-SNS pin to receive a sinusoidal input;
  a sample and hold (S/H) circuit coupled to the SR-SNS pin to sample the sinusoidal input and to provide a peak sampled voltage at an output of the S/H circuit; and
  a DC offset voltage circuit coupled between the output of the S/H circuit and a reference voltage input of the peak comparator to subtract a DC offset voltage from the peak sampled voltage.

2. The IC controller of claim 1, wherein the S/H circuit comprises:
 a S/H operational amplifier having a first input coupled to an input of the S/H circuit and an output coupled to a transistor between a supply voltage and a second input of the S/H operational amplifier; and
 a S/H capacitor having a first terminal coupled to the second input of the S/H operational amplifier and a second terminal coupled to a signal ground in the IC controller.

3. The IC controller of claim 2, further comprising:
 a reset switch connected in parallel with the S/H capacitor; and
 a reset comparator having a first input coupled to the SR-SNS pin and an output coupled to the reset switch to discharge the S/H capacitor.

4. The IC controller of claim 1, wherein the DC offset voltage circuit is programmable to set a minimum peak voltage detectable by the peak-detector block.

5. The IC controller of claim 4, wherein the minimum peak voltage is independent of process, voltage and temperature (PVT) variations of elements of the peak-detector block that are integrally formed on the IC controller.

6. The IC controller of claim 1, wherein the DC offset voltage circuit is programed to accurately sense a peak voltage within 50 mV from an actual voltage peak of an input signal generated based on the sinusoidal input.

7. The IC controller of claim 1, wherein the DC offset voltage circuit is part of the peak comparator.

8. The IC controller of claim 1, further comprising an internal resistive element coupled between the SR-SNS pin and an internal rectifier, wherein the internal rectifier is configured to prevent voltage division when the voltage sensed on SR-SNS pin is close to ground level.

9. The IC controller of claim 1, further comprising a clamping circuit coupled between the SR-SNS pin and the S/H circuit.

10. The IC controller of claim 9, further comprising a sensing capacitor coupled between the clamping circuit and the SR-SNS pin.

11. The IC controller of claim 1, wherein the IC controller is configured to control the AC-DC converter to provide a DC output voltage compatible with a Universal Serial Bus Type-C (USB-C) standard.

12. An alternating current-direct current (AC-DC) converter, wherein the AC-DC converter comprises:
   a transformer coupled between a primary side and a secondary side of the AC-DC converter, wherein the primary side is to receive a rectified AC input and the secondary side is to provide a DC output, and wherein the secondary side includes a synchronous rectifier (SR); and
   a secondary side integrated circuit (IC) controller comprising:
      a SR-SNS pin to sense a voltage at the SR on the secondary side; and
      a peak-detector block coupled to the SR-SNS pin to detect peak voltages sensed on the SR-SNS pin, the peak-detector block comprising:
         a peak comparator coupled to the SR-SNS pin to receive a sinusoidal input;
         a sample and hold (S/H) circuit coupled to the SR-SNS pin to sample the sinusoidal input and to provide a peak sampled voltage at an output of the S/H circuit; and
         a DC offset voltage circuit coupled between the output of the S/H circuit and a reference voltage input of the peak comparator to subtract a DC offset voltage from the peak sampled voltage.

13. The AC-DC converter of claim 12, further comprising a voltage divider comprising an external resistive element and an internal resistive element, wherein the external resistive element is coupled between the SR-SNS pin and the SR, and wherein the internal restive element is coupled within the secondary side IC controller between the SR-SNS pin and an internal rectifier.

14. The AC-DC converter of claim 13, wherein the external resistive element has a resistance in a range between 4KΩ and 10KΩ.

15. The AC-DC converter of claim 12, further comprising a connector compatible with a Universal Serial Bus Type-C (USB-C) standard, wherein the connector is coupled to the DC output.

16. A method of operating a secondary side integrated circuit (IC) controller for an alternating current-direct current (AC-DC) converter, the method comprising:
   receiving, by a peak-detector block in the secondary side IC controller, a sinusoidal signal from a synchronous rectifier (SR) on a secondary side of the AC-DC converter;
   clamping the sinusoidal signal to maximum positive and negative voltages to generate an input signal;
   sampling the sinusoidal signal and generating a peak sampled voltage;
   subtracting a DC offset voltage from the peak sampled voltage to generate a reference voltage; and
   comparing the input signal to the reference voltage, and outputting a peak voltage detection signal when the input signal goes below the reference voltage.

17. The method of claim 16, further comprising receiving the DC offset voltage from a DC offset voltage circuit in the secondary side IC controller.

18. The method of claim 17, wherein the DC offset voltage circuit is programed to accurately sense a peak voltage within 50 mV from an actual voltage peak of the input signal.

19. The method of claim 16, further comprising determining, by a line-feed-forward (LFF) block in the secondary side IC controller, whether the AC-DC converter is operating in a LFF sensing mode.

20. The method of claim 19, further comprising sensing the voltage applied on the SR-SNS pin without voltage division, when the AC-DC converter is determined to be operating in the LFF sensing mode.

* * * * *